US008383312B2

(12) United States Patent
Fujimoto et al.

(10) Patent No.: US 8,383,312 B2
(45) Date of Patent: Feb. 26, 2013

(54) RESIN FOR TONER AND TONER

(75) Inventors: Norikazu Fujimoto, Susono (JP); Hitoshi Itabashi, Yokohama (JP); Atsushi Tani, Suntoh-gun (JP); Tetsuya Yano, Tokyo (JP); Takeshi Ikeda, Suntoh-gun (JP); Takashi Kenmoku, Mishima (JP); Tatsuki Fukui, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/406,420

(22) Filed: Feb. 27, 2012

(65) Prior Publication Data

US 2012/0164569 A1    Jun. 28, 2012

Related U.S. Application Data

(60) Division of application No. 11/751,393, filed on May 21, 2007, now abandoned, which is a continuation of application No. PCT/JP2006/322909, filed on Nov. 10, 2006.

(30) Foreign Application Priority Data

Nov. 11, 2005  (JP) .................................. 2005-327142

(51) Int. Cl.
  *G03C 5/44*  (2006.01)
(52) U.S. Cl. .................................................... 430/109.4
(58) Field of Classification Search ................ 430/108.2, 430/108.4, 108.5; 528/272, 271, 274
See application file for complete search history.

(56) References Cited

U.S. PATENT DOCUMENTS

| 3,518,294 | A | 6/1970 | Rein et al. |
| 3,528,947 | A | 9/1970 | Lappin et al. |
| 4,797,339 | A | 1/1989 | Maruyama et al. |
| 4,957,840 | A | 9/1990 | Sakashita et al. |
| 4,996,127 | A | 2/1991 | Hasegawa et al. |
| 5,014,089 | A | 5/1991 | Sakashita et al. |
| 5,137,796 | A | 8/1992 | Takiguchi et al. |
| 5,262,267 | A | 11/1993 | Takiguchi et al. |
| 5,310,615 | A | 5/1994 | Tanikawa |
| 5,728,501 | A | 3/1998 | Nakanishi et al. |
| 5,741,617 | A | 4/1998 | Inaba et al. |
| 6,342,328 | B1 | 1/2002 | Takasaki et al. |
| 6,475,685 | B2 | 11/2002 | Uchida et al. |
| 7,393,912 | B2* | 7/2008 | Mihara et al. ............... 528/272 |
| 7,569,319 | B2 | 8/2009 | Uosaki et al. |
| 7,718,338 | B2 | 5/2010 | Fujimoto et al. |
| 8,067,136 | B2 | 11/2011 | Yano et al. |
| 2002/0045120 | A1 | 4/2002 | Yoshikawa et al. |
| 2005/0287463 | A1 | 12/2005 | Fukui et al. |
| 2006/0014921 | A1* | 1/2006 | Mihara et al. ............... 528/272 |
| 2006/0035098 | A1 | 2/2006 | Fukui et al. |
| 2007/0111125 | A1 | 5/2007 | Tominaga et al. |
| 2007/0117945 | A1 | 5/2007 | Minami et al. |

FOREIGN PATENT DOCUMENTS

| CN | 1717633 A | 1/2006 |
| EP | 1579276 B1 | 8/2006 |
| JP | S36-010231 | 7/1961 |
| JP | S59-053856 | 3/1984 |
| JP | S59-061842 | 4/1984 |
| JP | 62-106473 | 5/1987 |
| JP | 63-186253 | 8/1988 |
| JP | 01-112253 | 4/1989 |
| JP | 01-191156 | 8/1989 |
| JP | 02-214156 | 8/1990 |
| JP | 02-284158 | 11/1990 |
| JP | 03-015858 | 1/1991 |
| JP | 03-181952 | 8/1991 |
| JP | 04-162048 | 6/1992 |
| JP | 06-230609 | 8/1994 |
| JP | 08-050367 | 2/1996 |
| JP | 09-127734 | 5/1997 |
| JP | 11-184165 | 7/1999 |
| JP | 2972987 | 9/1999 |
| JP | 11-288129 | 10/1999 |
| JP | 2000-056518 | 2/2000 |
| JP | 2000-258958 | 9/2000 |
| JP | 3179663 | 4/2001 |
| JP | 2001-318484 | 11/2001 |
| JP | 2003-084501 | 3/2003 |
| JP | 2003-215853 | 7/2003 |
| JP | 2005-154698 | 6/2005 |
| JP | 2005-154699 | 6/2005 |
| WO | 2004/049075 A1 | 6/2004 |
| WO | 2004/061530 A1 | 7/2004 |
| WO | WO 2004/061530 * | 7/2004 |

OTHER PUBLICATIONS

European Office Action dated Mar. 19, 2012 in European Application No. 06 832 788.1.
Supplementary European Search Report dated Nov. 26, 2009 for European Application No. 06 83 2788.
Translation of International Preliminary Report on patentability for PCT/JP 2006/322909 dated Dec. 24, 2008.
Notification of First Office Action issued in counterpart application No. 2006800418247 by The State Intellectual Property Office of P.R. China dated Aug. 31, 2010, along with English-language translation—9 pages.
Japanese Office Action dated Jun. 4, 2012 in Japanese Application No. 2007-544241.

* cited by examiner

*Primary Examiner* — Gregory Listvoyb
(74) *Attorney, Agent, or Firm* — Fitzpatrick, Cella, Harper & Scinto

(57) ABSTRACT

A resin for toner containing a resin component having both a polyester unit produced by polycondensation of a polyhydric alcohol component and a polycarboxylic acid component, and an aryl group having a sulfonic ester group as a substituent; and a toner that contains the resin for toner.

10 Claims, No Drawings

RESIN FOR TONER AND TONER

This application is a division of Application No. 11/751,393, filed May 21, 2007, which is a continuation of International Application No. PCT/JP2006/322909, filed Nov. 10, 2006, which claims the benefit of Japanese Patent Application No. 2005-327142, filed Nov. 11, 2005.

BACKGROUND OF THE INVENTION

1. Field of the Invention

The present invention relates to a resin for toner contained in a toner used in an image forming method utilizing electrophotography or electrostatic printing or toner jet image forming method. In particular, the present invention relates to a resin for toner contained in a toner to be provided in a fixing method that involves fixing a toner image formed by the toner on a print sheet such as a transfer material under heat and pressure. Further, the present invention relates to a toner that contains the resin for toner.

2. Related Background Art

Conventionally, the image forming process utilizing electrophotography, electrostatic printing and so on is constructed such that an electrostatic latent image on a photosensitive drum is developed by electrostatic force depending on a potential difference on the photosensitive drum. In this case, toners are charged by friction between toners or between a toner and a carrier, and further due to friction with a control blade. Therefore, it is indispensable to control the chargeability of toner in addition to control of toner particle diameter and particle diameter distribution and so on.

To control the chargeability of the toner, the triboelectric property of the binder resin itself may be utilized. However, binder resins commonly used for toners have low triboelectric properties so that it is difficult to control the chargeability by the composition of the binder resin. Accordingly, generally, a charge control agent is added in order to impart chargeability to the toner.

Conventionally, negatively chargeable charge control agents include metal complex salts of monoazo dyes; nitrohumic acid and salts thereof; metal compounds, boron compounds, urea compounds and silicon compounds of salicylic acid, alkylsalicylic acids, dialkylsalicylic acids, naphthoic acid, dicarboxylic acids and so on; calixarenes; sulfonated copper phthalocyanine pigments; chlorinated paraffins, and so on. Those charge control agents have complex structures and are variable in their property and many of them have poor stability; in particular, most of them vary in chargeability depending on their environment such as temperature and humidity. Also, some of them are denatured due to decomposition or the like upon kneading with heating.

Further, the charge control agent to be added to the toners must be present on the surface of the toner in a certain amount to impart triboelectric chargeability to the toner. For this reason, the friction between the toners, collision of the toner with the carrier, friction of the toner with a conveyor sleeve, a roller, a control blade, a photosensitive drum or the like makes the charge control agent to come off from the surface of the toner, which may cause contamination of the carrier and so on, and contamination of a developing member, the photosensitive drum and so on. In this case, an increasing printing number of sheets leads to a decreased chargeability and results in progression of deterioration of peripheral members and causes problems such as a change in image density and a decrease in image quality. Therefore, a difficulty in coming off of the charge control agent from the toner must also be taken into consideration.

Further, to be applicable to full color toners, additives to the toners are preferably colorless, and further, to be usable for polymerization toners, the additives preferably have no polymerization inhibiting property.

As described above, many properties are required for charge control agents. Then, a charge control agent that can impart sufficient charges to the toner stably for a long period of time is demanded.

Further, processes for fixing toner images that have been developed include a pressure heating process utilizing a heat roller (hereinafter, referred to as "heat roller fixing process") and a heat fixing process that involves fixing the toner images while contacting a sheet to be fixed with a heating member through a fixing film (hereinafter, referred to as "film fixing process").

In the case of heat roller fixing process and film fixing process, the surface of the heat roller or fixing film is in pressure contact with the toner image on a sheet to be fixed. Therefore, the thermal efficiency of fusing the toner image on the sheet is extremely high. This allows rapid and good fixation to be performed.

In recent years, electrophotographic apparatuses are required to have various properties such as high image quality, compact size and light weight, high speed and high productivity, low energy consumption, high reliability, low cost, maintenance free property and so on. For the fixing process, development of a system and a material that can achieve higher speed, lower energy consumption, higher reliability is demanded. However, to solve those problems by the heat roller fixing process and film fixing process, it is indispensable to improve the fixing performance of the toner to a greater extent and it is necessary to improve low temperature fixing performance and also anti-offset performance.

Toners that contain wax having a high affinity with the binder resin exhibit good anti-offset performance and low temperature fixing performance under specified fixing conditions (see, for example, Japanese Patent Application Laid-Open Nos. H08-050367 and 2001-318484). However, in those toners, wax becomes compatible with the binder resin, so that the glass transition temperature of the toner and the melt viscosity of the toner tend to be decreased. In this case, if a further improvement of low temperature performance is attempted, chargeability in addition to storage stability and flowability tends to be deteriorated; in particular, when continuous printing is performed, a remarkable decrease in image density or a faulty image tends to occur. For this reason, a toner that has an excellent chargeability while it has an excellent low temperature fixing performance is demanded.

Incidentally, prevailing printer apparatuses include LED and laser beam printers in recent markets and a higher resolution is required in the technical trend. Further, copying machines are also in progress toward a higher function and hence toward digitalization. This direction of technology, which is mainly attained by a method of forming an electrostatic latent image by means of laser, also aims at a higher resolution. In addition, the developing method is required to be able to provide high precision images. As one means to meet the requirements, development of a toner with smaller particle size has been under way and toners having small particle sizes within specified particle size distributions (see, for example, Japanese Patent Application Laid-Open No. H01-112253, Japanese Patent Application Laid-Open No. H01-191156, Japanese Patent Application Laid-Open No. H02-284156, Japanese Patent Application Laid-Open No. H02-284158, Japanese Patent Application Laid-Open No. H03-181952, and Japanese Patent Application Laid-Open No. H04-162048) have been proposed.

However, the smaller the particle size of the toner, the more important it is to control the triboelectric charge of the toner. That is, in the case of the toner having a small particle size, failure to impart uniform charge quantity to individual toner particles results in a remarkable decrease in image stability. The reason will be as follows. (1) A toner having a smaller particle size has a greater affixing power (mirror image force, van der Waals force, etc.) to the photosensitive member, resulting in that the remaining toner after transfer tends to increase. (2) A decrease in toner particle size is accompanied by deterioration of flowability, so that the charge quantity of individual toner particles tends to be non-uniform, thus causing fog or a decrease in transferability.

Under the circumstances, a study for improving the charge properties of toner has been conducted intensively and in recent years, it has been proposed to use a resin having a charge control function as a raw material of toners because of consideration on environment, requirement for more stable chargeability, production cost, and so on (see, for example, Japanese Patent Publication No. H08-012467 and Japanese Patent No. 2663016).

According to the literatures, toners having an improved chargeability can be obtained. However, studies on the toners performed by the inventors of the present invention reveal that when the number of printouts becomes larger, toners of opposite polarity gradually increase in the developing device, which leads to a problem that so-called reversal fog tends to occur. Further, there is room for the toners to be improved for their low temperature fixability.

Further improved toners containing a copolymer of a sulfonic acid group-containing acrylamide and a vinyl monomer have been proposed (see, for example, Japanese Patent Application Laid-Open No. H11-184165, Japanese Patent Application Laid-Open No. H11-288129, and Japanese Patent Application Laid-Open No. 2000-056518). For the technologies disclosed in the literatures, however, there is room to be improved of charging performance (in particular, initial rise performance) when process speed is increased by a contact single-component development system or the like.

Conventionally, several proposals have been also made on the improvement of chargeability of the resin having a charge control function (see, for example, Japanese Patent Application Laid-Open No. H01-191156 and Japanese Patent Application Laid-Open No. H0-2284156). According to the literatures, toners showing relatively good rise in chargeability and having good dispersibility of various additives in the binder resin can be obtained. However, there is room for improvement of the stability of charge quantity before and after endurance running or under high temperature and high humidity and transferability.

Further, proposals have been made to use polyester resins having a sulfonic acid group as charge control resins (see, for example, Japanese Patent Application Laid-Open No. 2003-215853, Japanese Patent No. 2972987, and Japanese Patent No. 3179663). However, there is room for improvement of charging properties, and in particular, the stability of charge quantity under high temperature and high humidity conditions was insufficient.

SUMMARY OF THE INVENTION

Under the circumstances, the present invention has been made.

That is, it is an object of the present invention to provide a toner having a good fixability and charging properties.

It is another object of the present invention to provide a toner that can provide stable images from an initial stage to after printing out a large number of sheets.

As a result of extensive investigation, the inventors of the present invention have found that the charging performance of a toner can be improved and a resin for toners having excellent fixability, development and transfer properties can be obtained by attaching an aryl group having a sulfonic ester group as a substituent to a resin having a polyester unit. The present invention has been achieved based on this finding.

That is, the present invention relates to the following resin for toner or toner resin, and to the following toner.

(1) A resin for toner comprising a resin component having both a polyester unit produced by polycondensation of a polyhydric alcohol component and a polycarboxylic acid component, and an aryl group having a sulfonic ester group as a substituent.

(2) A toner comprising toner particles that contain at least a binder resin, a colorant, and the resin for toner.

Use of the resin for toner according to the present invention allows for providing a toner that has a good low temperature fixability and a stable triboelectric chargeability, excellent developability and transferability, and is capable of providing a stable image for long period of time.

Further features of the present invention will become apparent from the following description of exemplary embodiments.

DESCRIPTION OF THE PREFERRED EMBODIMENTS

The most characteristic feature of the resin for toner according to the present invention is that it contains an aryl group having a sulfonic ester group as a substituent. As compared with the resin having a sulfonic acid group that has been conventionally proposed, a resin having a sulfonic ester group makes it possible to improve the charging performance. As a result, the toner that contains the resin has excellent rise properties of initial triboelectric charging. Although the reason for this is not clear, it is presumed that a sulfonic ester group has a stronger hydrophobicity as compared with a sulfonic acid group because the electron absorbing property thereof functions without influence of water molecules in the air. Further, a functional group having a salt structure such as a sulfonic acid salt group is liable to influence of water molecules in the air in a high temperature and high humidity environment, so that a decrease in electric resistance on the surface of the toner tends to occur. Therefore, the sulfonic ester group is superior in stability of charge to a functional group having a salt structure such as a sulfonic acid salt group and generation of fog and the like can be suppressed.

Further, in the case where toners are produced through a granulating step in an aqueous medium, use of resins having a sulfonic acid group or a sulfonic acid salt group causes a strong adverse influence on granulability and hence the content thereof in the toner may be limited in some cases. On the other hand, the resin having a sulfonic ester group has little effect on granulability, so that its content in the toner can be increased.

In addition, it has been confirmed that the effect of the sulfonic ester group is exhibited remarkably by the aryl group. Presumably, this is because attachment of a sulfonic ester group through an aromatic ring results in a change in the level of the molecular orbital of the sulfonic ester group by the conjugate system of the aromatic ring. The aryl group is preferably a phenyl group or a naphthyl group.

Further, the aryl group may have other substituents, specific examples of which include an alkyl group having 1 to 8 carbon atoms, an alkoxy group having 1 to 8 carbon atoms, an acyl group, and an ester group. Further, the aryl group may form a 5-membered ring through a dicarboxyanhydride or a dicarboxylmide at adjacent positions. Preferred examples thereof include an alkyl group having 1 to 4 carbon atoms, a hydroxyl group, and an alkoxy group having 1 to 4 carbon atoms.

The bonding for coupling the aryl group to the resin is not particularly limited but an amide bond, an ester bond, a urethane bond, a urea bond, and an ether bond are preferable taking into consideration the influence on charging properties and production method. Of those, an amide bond, a urethane bond, and a urea bond are more preferable in view of the ability of introducing the effect of extending the above-mentioned conjugate system. Further, the aryl group may be bonded by a single bond or may be incorporated into the main chain through two or more bonds.

When the bond for coupling is other than the amide bond, urethane bond, or urea bond, it is preferable that the aryl group have an amide group. Having an amide group as a substituent enables extension of the conjugate system.

The sulfonic ester group is not particularly limited but it is not preferable in view of triboelectric charging properties that it be too bulky. Therefore, the sulfonic ester group preferably has the structure shown below:

(wherein $R^1$ is an alkyl group having 1 to 12 carbon atoms or a phenyl group), more preferably $R^1$ is an alky group having 1 to 8 carbon atoms, and still more preferably $R^1$ is an alkyl group having 1 to 4 carbon atoms.

Further, the aryl group containing the above-mentioned coupling portion preferably has a structure shown by the following formulae (1) or (2) from the viewpoints that it is less bulky and provides better triboelectric charging properties. Further, the functional groups shown by the following formulae (1) or (2) are preferable since they are easy to commercially produce and excellent in cost performance.

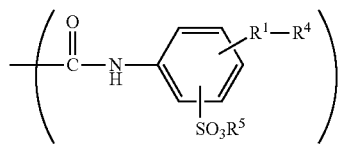

(wherein $R^1$ to $R^4$, independently, represent a hydrogen atom, an alkyl group having 1 to 6 carbon atoms, a hydroxyl group, or an alkoxy group having 1 to 6 carbon atoms, or $R^1$ to $R^4$ at adjacent positions, taken together, may form a benzene ring; and $R^5$ represents an alkyl group having 1 to 4 carbon atoms.)

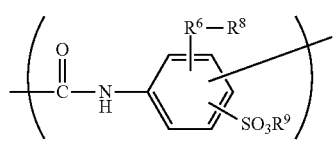

(wherein $R^6$ to $R^8$, independently, represent a hydrogen atom, an alkyl group having 1 to 6 carbon atoms, a hydroxyl group, or an alkoxy group having 1 to 6 carbon atoms, or adjacent two of $R^6$ to $R^8$, taken together, may form a benzene ring at adjacent positions; and $R^9$ represents an alkyl group having 1 to 4 carbon atoms.)

Further, the aryl group containing the coupling portion is more preferably a functional group having a structure shown by the following formula (3). In the functional group having the structure, the hydrogen in —NH— and the oxygen in —SO$_3$R tend to be coupled through a hydrogen bond to extend the conjugate system, thus providing more excellent triboelectric charging properties.

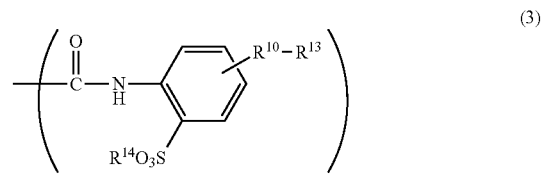

(wherein $R^{10}$ to $R^{13}$, independently, represent a hydrogen atom, an alkyl group having 1 to 4 carbon atoms, a hydroxyl group, or an alkoxy group having 1 to 4 carbon atoms and; and $R^{14}$ represents an alkyl group having 1 to 4 carbon atoms.)

In addition, the characteristic of the above-mentioned resin for toner is that it contains at least a polyester unit formed by polycondensation of a polyhydric alcohol component and a polycarboxylic acid component (hereinafter, referred to simply as "polyester unit"). Although detailed reason is unclear, it is presumed that the presence of an aryl group having a negative sulfonic ester group in the polyester unit having a strong negative charge provides more stable triboelectric charging properties. Having the polyester unit makes it easy to control compatibility or non-compatibility with the binder resin. Controlling the compatibility enables adjustment of the dispersibility of the resin for toner in the toner in a macroscopic viewpoint of uniform dispersion or localization and in addition thereto control of the state of presence of the resin for toner from the microscopic viewpoint of stretching of molecule or orientation of the functional group. This makes it easier to control so that a desired triboelectric charging property can be obtained.

In addition, it is confirmed that when the toner particles are formed in water, the effect of developing charge by the aryl group is not inhibited, the resin for toner tends to be localized near the surface of the toner, and better effect of improving the chargeability can be obtained. The reason that the resin for toner tends to be localized near the surface of the toner is presumed to be due to high polarities of the aryl group portion having a sulfonic ester group as a substituent and the polyester unit.

Note that the resin having a polyester unit means a resin that has portion having a polyester structure. Examples of the resin include polyester resins and hybrid resins having a polyester unit and a vinyl polymer unit chemically bonded to each other.

Hereinafter, specific examples of the compounds used as the polyhydric alcohol component are given.

Examples of the dihydric alcohol components include: alkyleneoxide adducts of bisphenol A such as polyoxypropylene-2,2-bis(4-hydroxyphenyl)propane, polyoxypropylene-2,2-bis(4-hydroxyphenyl)propane, polyoxyethylene-2,2-bis(4-hydroxyphenyl)propane, polyoxypropylene-polyoxyethylene-2,2-bis(4-hydroxyphenyl)propane, and polyoxypropylene-2,2-bis(4-hydroxyphenyl)propane; ethylene glycol; diethylene glycol; triethylene glycol; 1,2-propylene glycol; 1,3-propylene glycol; 1,4-butanediol; neopentyl glycol; 1,4-butenediol; 1,5-pentanediol; 1,6-hexanediol; 1,4-cyclohexanedimethanol; dipropylene glycol; polyethylene glycol; polypropylene glycol; polytetramethylene glycol; bisphenol A; and hydrogenated bisphenol A.

Examples of the trihydric or higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene.

Hereinafter, specific examples of the compounds used as the polycarboxylic acid component are given.

Examples of the dibasic carboxylic acid components include: aromatic dicarboxylic acids such as terephthalic acid, isophthalic acid, orthopthalic acid, naphthalenedicarboxylic acid, and biphenyldicarboxylic acid; saturated or unsaturated aliphatic dicarboxylic acids such as oxalic acid, succinic acid, succinic anhydride, adipic acid, azelaic acid, sebacic acid, dodecanoic diacid, hydrogenated dimer acid, fumaric acid, maleic acid, maleic anhydride, itaconic acid, itaconic anhydride, citraconic acid, citraconic anhydride, and dimer acid; and alicyclic dicarboxylic acids such as 1,4-cyclohexanedicarboxylic acid, 1,3-cyclohexanedicarboxylic acid, 1,2-cyclohexanedicarboxylic acid, 2,5-norbornenedicarboxylic acid and anhydrides thereof, tetrahydrophthalic acid and anhydrides thereof.

Examples of the tribasic or higher carboxylic acid components include trimellitic acid, pyromellitic acid, benzophenonetetracarboxylic acid, trimellitic anhydride, pyromellitic anhydride, benzophenonetetracarboxylic acid anhydride, trimesic acid, ethylene glycolbis(anhydrotrimelitate), glyceroltris(anhydrotrimelitate), and 1,2,3,4-butanetetracarboxylic acid. Those polycarboxylic acid components may be esters.

It is preferable that a catalyst be used in producing the polyester unit. Examples of the catalyst include: tin-containing catalysts such as dioctyltin oxide, monobutyltin oxide, and dibutyltin oxide; alkyl titanates such as tetraethyl titanate, tetrapropyl titanate, acetyltripropyl titanate, tetrabutyl titanate, tetrahexyl titanate, 2-ethylhexyl titanate, and polybutyl titanate; halogenated titaniums such as titaniumdichlorotitanium, trichlorotitanium, tetrachlorotitanium, trifluorotitanium, and tetrafluorotianium; titanium ketone enolates such as titanium acetylacetonate, titanium diisopropoxidebisacetylacetonate, and titanylacetylacetonate; and titanium carboxylates such as aliphatic titanium monocarboxylate, aliphatic titanium dicarboxylate, aliphatic titanium tricarboxylate, tetrabasic or higher aliphatic titanium polycarboxylate, and aromatic titanium carboxylate.

The content proportion of the aryl group having a sulfonic ester group as a substituent in the resin for toner will be explained. The proportion of the aryl group contained in the resin preferably is 0.1 to 0.9 mmol/g. If the proportion is less than 0.1 mmol/g, the charging property of the resin tends to be insufficient while it is more than 0.9 mmol/g, the dispersibility of the resin in the toner may be adversely influenced or the developability/transferability of the toner may be decreased.

Taking into consideration solubility in solvents and compatibility with the resin for toner, compatibility with waxes, it is preferable that the resin for toner be a hybrid resin in which a vinyl polymer unit formed by polymerization of a vinyl monomer component and the polyester unit are bonded to each other.

The method of synthesizing the resin for toner of the present invention is not particularly limited and the resin for toner can be produced by the known techniques.

For example, there is a method in which upon forming the polyester unit, a component capable of polycondensation and having the above-mentioned aryl group is made coexist in mixture with the polycarboxylic acid component and polyhydric alcohol component to introduce the aryl group into the main chain having the polyester unit. The "component capable of polycondensation" means a component that has two or more reactive groups such as a carboxylic group, a hydroxyl group, an amino group, and an isocyanato group in addition to the aryl group. Another method includes: forming a resin containing a polyester unit; and then bonding the aryl group thereto as a side chain or a functional group by a polymeric reaction. Further, in those methods, an aryl group having a sulfonic acid group instead of the sulfonic ester group can be introduced and then the sulfonic acid in the resin can be esterified.

Further, as a specific synthetic method, a method of synthesizing a resin containing a polyester unit having the formula (3) above is explained below.

i) A method of incorporating a carboxylic acid into a resin having a polyester unit, condensing the carboxylic acid with an amine of the following formula (4), and then esterifying the sulfonic acid group.

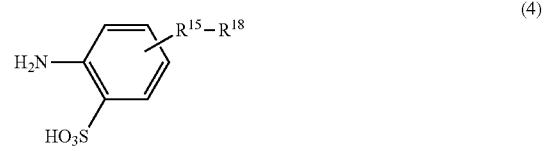

(wherein $R^{15}$ to $R^{18}$, independently, represent a hydrogen atom, an alkyl group having 1 to 4 carbon atoms, a hydroxyl group, a methoxy group, or an ethoxy group.)

ii) A method of incorporating a carboxylic acid into a resin having a polyester unit, and condensing the carboxylic acid with an amine of the following formula (5).

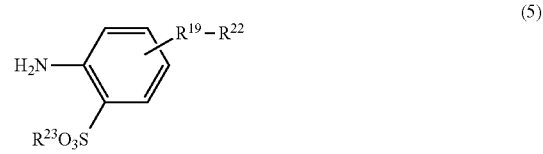

(wherein $R^{19}$ to $R^{22}$, independently, represent a hydrogen atom, an alkyl group having 1 to 4 carbon atoms, a hydroxyl group, a methoxy group, or an ethoxy group; and $R^{23}$ represents an alkyl group having 1 to 4 carbon atoms.)

Further, in the case of the hybrid resin, the following methods are exemplified.

iii) A method of polymerizing a polyester having an unsaturated bond and a monomer component containing a monomer of the following formula (6), and then esterifying sulfonic acid.

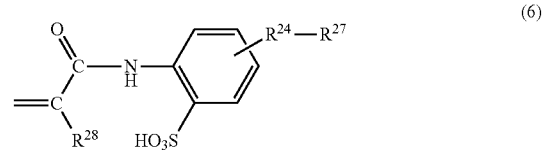

(wherein $R^{24}$ to $R^{27}$, independently, represent a hydrogen atom, an alkyl group having 1 to 4 carbon atoms, a hydroxyl group, a methoxy group, or an ethoxy group; and R²⁸ represents a methyl group or a hydrogen atom.)

iv) A method of polymerizing a polyester having an unsaturated bond with a monomer component containing a monomer of the following formula (7).

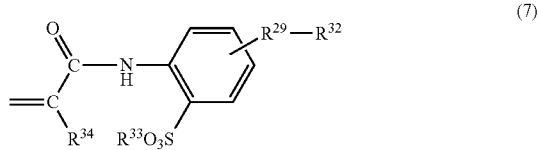

(7)

(wherein R²⁹ to R³², independently, represent a hydrogen atom, an alkyl group having 1 to 4 carbon atoms, a hydroxyl group, a methoxy group, or an ethoxy group; and R³³ represents an alkyl group having 1 to 4 carbon atoms; and R³⁴ represents a methyl group or a hydrogen atom.)

Further, besides, a synthetic method of utilizing a polymer crosslinking reaction through a urethane bond or a urea bond can also be used.

In the methods described in i) and ii) above, examples of the method of incorporating a carboxylic acid to the resin having a polyester unit include a method of utilizing a carboxylic acid derived from a polyhydric carboxylic acid of the polyester unit and a method of forming a hybrid resin with a component having a carboxylic acid.

In the methods described in i) and ii) above, the method of condensing the carboxyl group in the resin and an amine may be a known method. For example, a method in which triphenyl phosphite is reacted in an organic base may be exemplified.

In the methods described in i) and iii) above, the method of esterifying the sulfonic acid group in the resin may be a known method. Specific examples thereof include: a method of chlorinating a sulfonic acid and then reacting the resultant with an alcohol; a method of using a methyl esterifying agent such as dimethyl sulfate, trimethyl silyldiazomethane, trimethyl phosphate and so on; and a method of using an orthoformic ester and so on. Of those, the method of using an orthoformic ester is preferable. By this method, the esterification of the sulfonic acid group can be readily performed by reacting an orthoformic ester having a desired alkyl group with a resin containing a sulfonic acid under relatively mild conditions, so that the ratio of esterification can be readily controlled by the reaction temperature, reaction time, the amount of the orthoformic ester, the amount of the solvent and so on.

Specific examples of the orthoformic ester to be used in the present invention include trimethylorthoformate, triethylorthoformate, tri-n-propylorthoformate, tri-iso-propylorthoformate, tri-n-butylorthoformate, tri-sec-butylorthoformate, tri-tert-butylorthoformate, and mixtures thereof.

The method of synthesizing monomers represented by the formulae (6) and (7) above may be a known method. Example thereof includes a method of amidating the amine represented by the formula (4) or (5) above with a reactive acrylate (for example, acrylic acid chloride or methacrylic anhydride) and so on.

The vinyl monomer component that can be used is not particularly limited when the resin for toner is the hybrid resin described above. An addition polymerization monomer is preferable. Specific examples of the addition polymerization monomer include: styrenes such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, and derivatives thereof; ethylenically unsaturated monoolefins such as ethylene, propylene, butylene, and isobutylene; unsaturated polyenes such as butadiene and isoprene; vinyl halides such as vinyl chloride, vinylidene chloride, vinyl bromide, and vinyl iodide; vinyl esters such as vinyl acetate, vinyl propionate, and vinyl benzoate; α-methylene aliphatic monocarboxylates such as methyl methacrylate, ethyl methacrylate, propyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate; acrylates such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate; vinyl ethers such as vinyl methyl ether, vinyl ethyl ether, and vinyl isobutyl ether; N-vinyl compounds such as vinyl methyl ketone, vinyl hexyl ketone, and methyl isopropenyl ketone; vinylnaphthalenes; and acrylic acid derivatives such as acrylonitrile, methacrylonitrile, and acrylamide.

The polymerization initiators that can be used when the monomer components as described above are copolymerized include various substances such as peroxide polymerization initiators and azo polymerization initiators.

Examples of the peroxide polymerization initiators which can be used include: organic peroxide polymerization initiators such as peroxyester, peroxydicarbonate, dialkylperoxide, peroxyketal, ketone peroxide, hydroperoxide, and diacylperoxide; and inorganic peroxide polymerization initiators such as persulfate and hydrogen peroxide.

Specific examples of the peroxide polymerization initiators include: peroxyester such as t-butyl peroxyacetate, t-butylperoxylaurate, t-butylperoxypivalate, t-butylperoxy-2-ethylhexanoate, t-butylperoxyisobutyrate, t-butylperoxyneodecanoate, t-hexylperoxyacetate, t-hexylperoxylaurate, t-hexylperoxypivalate, t-hexylperoxy-2-ethylhexanoate, t-hexylperoxyisobutyrate, t-hexylperoxyneodecanoate, t-butylperoxybenzoate, α,α'-bis(neodecanoylperoxy)diisopropylbenzene, cumylperoxyneodecanoate, 1,1,3,3-tetramethylbutylperoxy-2-ethylhexanoate, 1,1,3,3-tetramethylbutylperoxyneodecanoate, 1-cyclohexyl-1-methylethylperoxyneodecanoate, 2,5-dimethyl-2,5-bis(2-ethylhexanoylperoxy)hexane, 1-cyclohexyl-1-methylethylperoxy-2-ethylhexanoate, t-hexylperoxyisopropylmonocarbonate, t-butylperoxyisopropylmonocarbonate, t-butylperoxy-2-ethylhexylmonocabonate, t-hexylperoxybenzoate, 2,5-dimethyl-2,5-bis(benzoylperoxy)hexane, t-butylperoxy-m-toluoylbenzoate, bis(t-butylperoxy)isophthalate, t-butylperoxy maleic acid, t-butylperoxy-3,5,5-trimethylhexanoate, and 2,5-dimethyl-bis(m-toluoylperoxy)hexane; diacyl peroxides such as benzoyl peroxide, lauroyl peroxide, and isobutyryl peroxide; peroxydicarbonates such as diisopropylperoxydicarbonate and bis(4-t-butylcyclohexyl)peroxydicarbonate; peroxyketals such as 1,1-di-t-butylperoxycyclohexane, 1,1-di-hexylperoxycyclohexane, 1,1-di-t-butylperoxy-3,3,5-trimethylcyclohexane, and 2,2,-di-t-butylperoxybutane; dialkyl peroxides such as di-t-butyl peroxide, dicumyl peroxide, and t-butylcumyl peroxide; and t-butylperoxyallylmonccarbonate for another example. Further, examples of the azo-based polymerization initiators which can be used include 2,2'-azobis-(2,4-dimethylvaleronitrile), 2,2'-azobisisobutyronitrile, 1,1'-azobis(cylohexane-1-carbonitrile), 2,2'-azobis-4-methoxy-2,4-dimethylvaleronitrile, and azobisisobutyronitrile.

Note that two or more of those polymerization initiators may be used simultaneously as necessary.

In this case, the quantity of the polymerization initiators used is preferably 0.1 to 20 parts by mass with respect to 100 parts by mass of the monomer.

As the polymerization method, any of a solution polymerization method, a suspension polymerization method, an emulsion polymerization method, a dispersion polymerization method, a precipitation polymerization method, a bulk polymerization method, and so on may be used and is not particularly limited.

When the molecular weight of the resin for toner is too small, members such as a sleeve and a carrier tend to be contaminated. In addition, the charging property of the aryl group may be adversely affected. On the contrary, when the molecular weight of the resin for toner is too large, not only there is the possibility that the fixability of the toner will be deteriorated but also the state of the resin for toner in the toner is unstable, so that uniform charging property can not be exhibited. From those viewpoints, the molecular weight of the resin for toner be preferably 2,000 to 200,000 in terms of weight average molecular weight as calculated by gel permeation chromatography. A more preferred range is a weight average molecular weight of 5,000 to 100,000.

Further, it is preferable that the molecular weight distribution of the resin for toner be narrow from the viewpoints of charging property and fixability. A preferable molecular weight distribution range is such that the ratio (Mw/Mn) of the weight average molecular weight (Mw) to the number average molecular weight (Mn), calculated by gel permeation chromatography (GPC) is preferably 1.0 to 6.0, more preferably 1.0 to 4.0.

The measurement of molecular weight by GPC can be performed as follows.

Each resin sample is added to THF (tetrahydrofuran) and the mixture is left to stand at room temperature for 24 hours. The obtained solution is filtered through a solvent-resistant membrane filter having a pore diameter of 0.2 µm to obtain a sample solution, which is measured under the following conditions. Note that when preparing samples, the amount of THF is adjusted such that the concentration of the resin for toner is 0.4 to 0.6 mass %.

Apparatus: High performance GPC HLC8120 GPC (manufactured by Tosoh)

Column: Seven sequences of Shodex KF-801, 802, 803, 804, 805, 806, 807 (manufactured by Showa Denko K. K)

Eluant: Tetrahydrofuran

Flow rate: 1.0 ml/min

Oven temperature: 40.0° C.

Amount of sample injected: 0.10 ml

Further, upon calculation of the molecular weight of samples, a molecular weight calibration curve prepared using standard polystyrene resins (TSK Standard Polystyrene F-850, F-450, F-288, F-128, F-80, F-40, F-20, F-10, F-4, F-2, F-1, A-5000, A-2500, A-1000, A-500 manufactured by Tosoh) is used.

To exhibit effects without deteriorating the fixability of the toner, it is preferable that the glass transition temperature (Tg) of the resin for toner be controlled and Tg measured using a differential scanning calorimeter (DSC) is preferably 45° C. to 90° C., more preferably 50° C. to 85° C.

To improve the compatibility with the binder resin and further localize the resin for toner near the surface of the toner when producing toner particles in an aqueous medium, it is preferable that the resin for toner have a specified acid value. However, when the acid value is too high, the charging property of the aryl group may be inhibited and the chargeability of the toner may be influenced by a change in the environment (temperature and humidity), so that high acid values are undesirable. A preferable range of the acid value of the resin for toner is 0.1 to 40.0 mgKOH/g, more preferably 2.0 to 30.0 mgKOH/g.

The acid value in the present invention is obtained by the following method.

Basic operations are based on JIS K-0070.

1) 0.5 to 2.0 g of pulverisates of a sample was precisely weighed. The weight obtained is defined as W (g).

2) The sample is charged in a 300-ml-beaker, and 150 ml of a mixed liquid of toluene/ethanol (4/1) is added to dissolve the sample.

3) Using a 0.1 mol/l ethanol solution of KOH, titration is performed using a potentiometric titrator (automatic titration may be used with, for example, a potentiometric titrator AT-400 (winwork station) and an ABP-410 electrically driven biuret manufactured by Kyoto Electric Co., Ltd.).

4) The quantity of the KOH solution used on this occasion is defined as S (ml). Simultaneously, blank is measured to define the quantity of this KOH solution used on this occasion as B (ml).

5) Acid value is calculated by the following equation. f is a factor of KOH.

$$\text{Acid value (mgKOH/g)} = \{(S-B) \times f \times 5.61\}/W$$

The toner of the present invention contains a binder resin, a colorant, and the above-mentioned resin for toner.

A preferable range of the content of the resin for toner is 0.1 to 20 parts by mass, more preferably 0.3 to 10 parts by mass with respect to 100 parts by mass of the binder resin.

The binder resin that is used in the present invention is not particularly limited. Examples thereof include styrene resins, acrylic resins, styrene-acrylic resins, styrene-methacrylic resins, polyethylene resins, polyethylene-vinyl acetate resin, vinyl acetate resins, polybutadiene resins, phenol resins, polyurethane resins, polybutyral resins, and polyester resins. Of those, styrene resins, acrylic resins, styrene-acrylic resins, styrene-methacrylic resins, and polyester resins are preferable.

The binder resin preferably has a peak molecular weight of 3,000 to 80,000 as calculated by GPC of THF-soluble component. If the molecular weight is smaller than 3,000, the chargeability may cause a problem. On the other hand, if the molecular weight of the binder resin is larger than 80,000, low temperature fixation becomes difficult. Note that the method of measuring the peak molecular weight is the same as the method of measuring the molecular weight of the resin for toner as described above.

The toner preferably contains waxes. Waxes contained enable one to provide a toner having excellent low temperature fixability and anti-offset property. Further, in the method of forming an image using a toner containing waxes, a fixed image having excellent surface smoothness can be obtained.

When the toner contains a wax, the molten wax upon fixation acts as a release agent between a transfer material and a fixing member due to its surface tension and significantly improves anti-offset performance. Also, by accelerating melting of the toner upon fixation, low temperature fixability can also be improved. Waxes showing a main peak in 45° C. to 130° C., more preferably 50° C. to 110° C., and still more preferably 50° C. to 90° C. in a DSC curve when elevating the temperature of the toner as measured on a differential scanning calorimeter are advantageous. If the main peak temperature is too high, the releasing action at low temperatures does not appear, so that the toner tends to have a poor fixability. On the contrary, if the main peak temperature is too low, the melt viscosity of the toner becomes too low, so that no releasing action occurs on the higher temperature side and sufficient anti-offset property is difficult to obtain. Thus, toner causes the phenomena of transfer-material-winding-about or-attachment to the fixing member to occur.

It is preferable that a wax be contained in an amount within the range of 0.5 to 30 parts by mass with respect to 100 parts by mass of the binder resin. If the content is less than 0.5 parts by mass, the effect of improvement in anti-offset property described above becomes insufficient. On the other hand, if the content of the wax is more than 30 parts by mass, it causes that long term storage stability is decreased and inhibits dispersion of other toner materials. Further, since the amount of wax present near the surface of the toner increases, the flowability of the toner is decreased, resulting in a decrease in image properties.

The waxes that can be used in the present invention are not particularly limited as long as they may be any that has a heat absorption main peak within the above-mentioned range. Specific examples thereof include paraffin wax, microcrystalline wax, petroleum waxes such as petrolatum and derivatives thereof, montan wax and derivatives thereof, hydrocarbon waxes and derivatives thereof by a. Fisher-Tropsch method, polyolefin waxes and derivative thereof represented by polyethylene, natural waxes such as carnauba wax and candelilla wax and derivatives thereof. Note that the derivatives include oxides, block copolymers with vinyl monomers, and graft modified products. Further, waxes include, for example, higher aliphatic alcohols, fatty acids such as stearic acid and palmitic acid, or compounds thereof, acid amide waxes, ester waxes, ketones, hardened castor oil and derivatives thereof, vegetable waxes, and animal waxes.

As described above, to obtain toners that have excellent fixability, it is preferable that the glass transition temperature of the toner be also controlled. The glass transition temperature of the toner obtained from the DSC curve is preferably 45 to 70° C., more preferably 50 to 70° C. By controlling the glass transition temperature of the toner to be within the above-mentioned range, excellent low temperature fixation performance and anti-blocking property can be obtained. Further, under high temperature environment, fusion adhesion of toner to the developing device and mutual fusion between toners can be suppressed to prevent a decrease in flowability.

In the present invention, the fusion peak of the wax, softening temperature of the toner, and glass transition temperature can be measured using, for example, a differential scanning calorimetric (DSC) apparatus (M-DSC manufactured by TA Instruments Co.). The measuring method involves precision weighing about 6 mg of a sample in an aluminum pan, using a vacant aluminum pan as a reference pan, and performing measurement in a nitrogen atmosphere at a modulation amplitude of ±0.6° C. and a frequency of 1/minute. From a reversing heat flow curve when elevating the temperature, a glass transition temperature is obtained by a midpoint method. The fusion peak is obtained from the heat flow curve obtained in the above-mentioned measurement.

The toner of the present invention contains a colorant.

As a black colorant, there can be utilized carbon black, a magnetic material, and a mixture of the following yellow/magenta/cyan colorants adjusted to black color.

The yellow colorants that can be used include as pigments, those compounds represented by condensed azo compounds, isoindolinone compounds, anthraquinone compounds, azo metal complex methine compounds, and arylamide compounds. Specific examples of the yellow colorants include C.I. Pigment Yellow 3, 7, 10, 12, 13, 14, 15, 17, 23, 24, 60, 62, 74, 75, 83, 93, 94, 95, 99, 100, 101, 104, 108, 109, 110, 111, 117, 123, 128, 129, 138, 139, 147, 148, 150, 166, 168, 169, 177, 179, 180, 181, 183, 185, 191:1, 191, 192, 193, and 199. Examples of the dye-based yellow colorants include C.I. Solvent Yellow 33, 56, 79, 82, 93, 112, 162, and 163, and C.I. Disperse Yellow 42, 64, 201, and 211.

As the magenta colorants, there are used condensed azo compounds, diketopyrrolopyrrole compounds, anthraquinone, quinacridone compounds, basic dye lake compounds, naphthol compounds, benzimidazolone compounds, thioindigo compounds, and perylene compounds. Specifically, C.I. Pigment Red 2, 3, 5, 6, 7, 23, 48:2, 48:3, 48:4, 57:1, 81:1, 122, 146, 166, 169, 177, 184, 185, 202, 206, 220, 221, and 254, and C.I. Pigment Violet 19 are particularly preferable.

As the cyan colorants, there are used copper phthalocyanine compounds and derivatives thereof, anthraquinone compounds, and basic dye lake compounds. Specifically, C.I. Pigment Blue 1, 7, 15, 15:1, 15:2, 15:3, 15:4, 60, 62, and 66 are particularly preferably used.

Those colorants can be used alone or in admixture, or further in a solid solution state. The colorants are selected in light of hue angle, chroma saturation, luminance, weatherability, OHP transparence, dispersibility in toners. The colorant is added in amounts of 1 to 20 parts by mass with respect to 100 parts by mass of the binder resin.

Further, the toner of the present invention may contain a magnetic material so that it can be used as a magnetic toner. In this case, the magnetic material may serve as a colorant as well. Examples of the magnetic material include iron oxides such as magnetite, hematite, and ferrite; metals such as iron, cobalt, and nickel, or alloys of those metals with other metals such as aluminum, cobalt, copper, lead, magnesium, tin, zinc, antimony, beryllium, bismuth, cadmium, calcium, manganese, selenium, titanium, tungsten, and vanadium, and mixtures thereof.

The magnetic materials used in the present invention are more preferably surface-modified magnetic materials. When used in polymerization toners obtained by a production method such as a polymer melt suspension method or a suspension polymerization method, it is preferable that the magnetic material is subjected to hydrophobic treatment with a surface modifier that is a substance having no inhibition on polymerization. The surface modifiers include, for example, silane coupling agents and titanium coupling agents.

The magnetic materials are preferably those having number average particle diameter of 2 μm or less, preferably about 0.1 to about 0.5 μm. The amount of the magnetic material to be contained in the toner is preferably 20 to 200 parts by mass, particularly preferably 40 to 150 parts by mass, with respect to 100 parts by mass of the binder resin.

Magnetic materials that have magnetic properties when applied 796 kA/m (10 kOe), i.e., a coercive force (Hc) of 1.59 to 23.9 kA/m (20 to 300 Oe), a strength of magnetization ($\sigma_{10k}$) of 50 to 200 emu/g, a residual magnetization ($\sigma r$) of 2 to 20 emu/g are preferable.

To develop more minute latent dots reliably for obtaining a higher image quality, it is preferable that the toner have a weight average particle diameter of 3.0 to 9.0 μm, more preferably 4.0 to 6.5 μm. When the weight average particle diameter of the toner is within the above-mentioned range, good transfer efficiency can be obtained, so that the scraping of the photosensitive member and fusion of the toner can be suppressed and also good flowability can be maintained. Therefore, occurrence of fog and a decrease in transferability can be suppressed. Further, formation of black spots around character or line images can be suppressed, so that high resolution images can be obtained.

The weight average particle diameter and particle diameter distribution of the toner can be measured by various methods such as those using a Coulter Counter® TA-II Model or Coulter Multisizer™ (manufactured by Coulter, Inc.). In the present invention, Coulter Multisizer™ is used in connection with an interface (manufactured by Nikkaki Co., Ltd.) that outputs number distribution or volume distribution and PC9801 personal computer (manufactured by NEC Corporation). As the electrolyte, 1% NaCl aqueous solution is prepared using first-grade sodium chloride. The electrolytes that can be used include, for example, ISOTON R-II (manufactured by Coulter Scientific Japan). The measuring method is as follows. That is, 0.1 to 5 ml of a surfactant (preferably dodecylbenzenesulfonic acid sodium salt) as a dispersant and further 2 to 20 mg of a sample to be measured is added to 100 to 150 ml of the aqueous electrolyte solution. The electrolyte having dispersed therein the sample is dispersed for about 1 to 3 minutes with an ultrasonic dispersion machine, and the resultant is measured for volume and number of toner particles of 2.0 μm or more with the Coulter Multisizer™ using an aperture 100 μm as its aperture to calculate volume distribution and number distribution, from which weight average particle diameter (D4) is determined.

The average circularity of the toner is preferably 0.955 or more. Particularly preferably, the average circularity of the toner is 0.970 or more. When the average circularity of the toner is high, a synergistic effect with the resin for toner is exhibited to promote uniform chargeability, thus providing a toner having very excellent transferability. Presumably, this is because the contact area of the toner particles with the photosensitive member is small and the adhesive force of the toner particles onto the photosensitive member due to mirror force or van der Waals force is decreased and in addition, local overcharging is suppressed.

In the present invention, the average circularity is used as a simple means for quantitatively expressing the shape of particles. In the present invention, measurement is performed by using a flow-type particle image measuring apparatus "FPIA-3000 Model" (manufactured by Sysmex Corporation) that has a resolution of 0.37 μm per pixel and takes a picture of 512 pixel×512 pixel for analysis, and a circularity of the measured particle is obtained by the following equation, and further a value obtained by dividing the sum of circularities of all the particles determined by the total number of the particles as shown in the following equation is defined as an average circularity.

Circularity $C$=Circumferential length of a circle having the same area as a projection area of a particle/Circumferential length of projection image of a particle $$\text{Average circularity } \overline{C} = \sum_{i=1}^{m}(C_i/m)$$

Note that in the present invention, an average circularity is determined as follows. That is, particle analysis is performed using "FPIA-3000" at a digitization threshold of 85% to obtain circularities. Then, the obtained circularities are assigned particle after particle to respective channels obtained by dividing a range of circularity of 0.40 to 1.00 by 800, and the average circularity is calculated using the center values and frequencies of the channels. More specifically, the measuring method is performed as follows. That is, after a suitable amount of a surfactant, preferably dodecylbenzenesulfonic acid sodium salt as a dispersant is added to 20 ml of deionized water, 0.02 g of a sample to be measured is added and the resultant mixture is subjected to dispersing treatment for 2 minutes using a desk-top type ultrasonic washer disperser (for example, "VS-150" manufactured by Velvo-Clear Co., Ltd.) at an oscillation frequency of 50 kHz and electric output of 150 W to obtain a dispersion for measurement. On this occasion, the dispersion is cooled as appropriate so that the temperature of the dispersion is 10° C. or more and 40° C. or less.

For the measurement, the above-mentioned flow-type particle image measuring apparatus having mounted thereon a standard objective lens (10 times) is used and Particle Sheath "PSE-900A" (manufactured by Sysmex) is used as a sheath fluid. The dispersion prepared according to the above-mentioned procedure is introduced into the flow-type particle image measuring apparatus and 3,000 particles are measured in a total count mode with limiting the analysis particle diameter to a circle-corresponding diameter of 2.00 μm or more and 200.00 μm or less to obtain an average circularity of the toner.

Upon measurement, automatic focus adjustment is performed using standard latex particles (for example, 5200A manufactured by Duke Scientific Corporation, diluted with deionized water) in advance. Then, it is preferable that focus adjustment be performed for every two hours from the start of measurement.

Note that, in the examples of the present invention, measurements were performed using a flow-type particle image measuring apparatus on which correction operation was performed by Sysmex Corporation and a Correction Certificate by Sysmex Corporation was issued under the same measurement and analysis conditions except that analysis particle diameter was limited to a circle-corresponding diameter of 2.00 μm or more and 200.00 μm or less.

The "circularity" in the present invention is a measure of the degree of the irregularities of a toner particle. When a toner particle is of a completely spherical shape, the circularity is 1.000. The more complicated a surface shape, the lower the circularity.

Generally, toners having an amorphous shape have low charge uniformity at protruded portions or depressed portions of the toner. Moreover, the toners have an increased contact area between the photosensitive member (electrostatic latent image bearing member) and the toner because of being amorphous, resulting in a high toner attraction force, to cause an increase in transfer residual toner.

The toner may contain other charge control agents as necessary to aid its triboelectric property. Specifically, the charge control agent that can be contained include negative-type control agents such as metal compounds of salicylic acid, alkyl salicylic acid, dialkylsalicylic acid, naphthoic acid, and dicarboxylic acid; high polymer compounds having a sulfonic acid or carboxylic acid in the side chain; boron compounds; urea compounds; silicon compounds; and calixarene; and positive-type control agents such as quaternary ammonium salts, high polymer compounds having the quaternary ammonium salt in the side chain thereof, guanidine compounds, and imidazole compounds.

The method of producing the toner is not particularly limited and known production methods are used. Specifically, methods that produce toner particles directly using suspension polymerization methods described in Japanese Patent Publication No. S36-10231, Japanese Patent Application Laid-Open Nos. S59-53856 and S59-61842; methods that produce toner particles by an interfacial polymerization method such as microcapsule production method; toner formation by a coacervation method; a method of forming toner particles by an association polymerization method that makes at least one type fine particles coagulate to provide particles of a desired particle size as disclosed in Japanese Patent Application Laid-Open Nos. S62-106473 and S63-186253; a method of producing toner particles by a dispersion polymerization method characterized by monodispersion; a polymer dissolution (melting) suspension method that involves dissolving necessary resins in a water-insoluble organic solvent and then forming toner particles in water; a method of preparing toner particles by an emulsion dispersion method; and a pulverization method that involves kneading toner components to disperse them uniformly using a compression kneader, an extruder or a media dispersion machine, cooling the kneaded mixture, pulverizing the cooled kneaded mixture mechanically or by making the mixture collide against a target under a jet stream to a desired toner particle size, and classifying the toner particles to produce a toner having a sharpened particle diameter distribution; and a method of providing toner particles by subjecting the toner obtained by the pulverization method to spheronization treatment, for example, by heating it in a solvent.

However, the method that exhibits the effect of adding the resin for toner of the present invention more significantly is a polymer dissolution (melting) suspension method or a suspension polymerization method. This is because in the step of granulation, in an aqueous medium (granulation step), the resin for toner can be effectively localized near the surface of the toner particles. Hereinafter, each suspension method is explained.

In the method of producing toner particles by a polymer dissolution (melting) suspension method, first a binder resin, a resin for toner, and a colorant are dissolved and mixed or dispersed in an organic medium, or a resin for toner and a colorant are dissolved and mixed or dispersed in a resin that is molten with heat. Further, the resultant together with wax and other additives as necessary is uniformly dissolved and mixed or dispersed using an agitator or the like to prepare a liquid mixture for forming a toner. On this occasion, a colorant, wax and other additives are melt-kneaded in advance and the resultant may be added. The liquid mixture thus obtained is added in a dispersed medium (preferably an aqueous medium) containing a dispersion stabilizer and dispersed and suspended to a toner particle size using a high speed dispersion machine such as a high speed agitator or an ultrasonic dispersion machine as an agitating apparatus (agitating step). Then, in the case where an organic solvent is used to dissolve the binder resin, the organic solvent is removed by heating or pressure reduction and a solvent such as methanol, ethanol, 1-propanol, t-butyl alcohol, or acetone is added to completely remove the organic solvent to obtain toner particles.

In the method of producing toner particles by a suspension polymerization method, first a colorant is uniformly dissolved and mixed or dispersed in a portion of polymerizable monomer or a total amount of the polymerizable monomer using an agitator or the like. In particular, when the colorant is a pigment, it is preferable that a portion of the polymerizable monomer and the pigment be treated in a dispersion machine to form a pigment-dispersed paste and the resultant is finely dissolved and mixed or dispersed together with the remaining polymerizable monomer, a resin for toner, and a polymerization initiator as well as wax and other additives as necessary in an agitator to prepare a monomer composition. The thus obtained monomer composition is added to a dispersed medium (preferably an aqueous medium) containing a dispersion stabilizer and is finely dispersed until it comes into a toner particle size using a high speed dispersion machine such as a high speed agitator or an ultrasonic dispersion machine as an agitating apparatus (granulation step). Then, the monomer composition finely dispersed is subjected to polymerization reaction with light or heat in the polymerization step and thus a toner can be obtained.

The organic medium that can be used in the polymer dissolution (melting) suspension method may be determined depending on the toner binder resin and is not particularly limited. Specifically, it is selected from ether alcohols such as methyl cellosolve, cellosolve, isopropyl cellosolve, butyl cellosolve, diethylene glycol, and monobutyl ether; ketones such as acetone, methyl ethyl ketone, and methyl isobutyl ketone; esters such as ethyl acetate, butyl acetate, ethyl propionate, and cellosolve acetate; hydrocarbons such as hexane, octane, petroleum ether, cyclohexane, benzene, toluene, and xylene; halogenated hydrocarbons such as trichloroethylene, dichloromethane, and chloroform; ethers such as ethyl ether, dimethyl glycol, and trioxanetetrahydrofuran; acetals such as methylal and diethyl acetal; sulfur/nitrogen-containing organic compounds such as nitropropene, nitrobenzene, and dimethyl sulfoxide.

The method of dispersing a pigment composition in an organic medium may be a known method. For example, a resin, a pigment dispersant are dissolved as necessary in an organic medium and while agitating the resulting mixture, a pigment powder is gradually added thereto and allowed to blend in the solvent sufficiently. Further, the pigment can be finely dispersed in the mixture stably, that is, in the form of fine particles by applying a mechanical shearing force to the mixture by a dispersion machine such as a ball mill, a paint shaker, a dissolver, an attriter, a sand mill, or a high speed mill.

The resin as a binder resin for use in the polymer dissolution (melting) suspension method is not particularly limited. Examples thereof include styrene resins, acrylic resins, methacrylic resins, styrene-acrylic resins, styrene-methacrylic resins, styrene acrylic resin-methacrylic resins, polyethylene resins, polyethylene-vinyl acetate resins, vinyl acetate resins, polybutadiene resins, phenol resins, polyurethane resins, polybutyral resins, and polyester resins. Of those, styrene resins, acrylic resins, styrene-acrylic resins, styrene-methacrylic resins, styrene-acrylic resin-methacrylic resins, and polyester resins are preferable in view of the toner properties.

The polymerizable monomer that can be used advantageously in the suspension polymerization method is an addition polymerizable monomer or a condensation polymerization monomer and those exemplified as monomers that can be used in the above-mentioned production method for hybrid resins can be used.

The dispersion medium that can be used in the above-mentioned production method is determined depending on the solubilities of the binder resin, organic medium, monomer and resin for toner in the dispersion medium, and an aqueous medium is preferable. Examples of the aqueous medium that can be used include water; alcohols such as methyl alcohol, ethyl alcohol, denatured ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; ether alcohols such as methyl cellosolve, cellosolve, isopropyl cellosolve, butyl cellosolve, and diethylene glycol monobutyl ether. Besides, the dispersion medium may be selected from water-soluble media that include ketones such as acetone, methyl ethyl ketone, and methyl isobutyl ketone; esters such as ethyl acetate, butyl acetate, ethyl propionate, and cellosolve acetate; ethers such as ethyl ether and diethylene glycol; acetals such as methylal and diethyl acetal; acids such as formic acid, acetic acid, and propionic acid; sulfur/nitrogen-containing organic compounds such as nitropropene, nitrobenzene, dimethylamine, monoethanolamine, pyridine, dimethyl sulfoxide, and dimethylformamide. The dispersion medium is particularly preferably water or alcohols. Two or more of those solvents may be used in admixture. The concentration of the liquid mixture or monomer composition to the dispersed medium is preferably 1 to 80 mass % and more preferably 10 to 65 mass %.

The dispersion stabilizers that can be used when the aqueous dispersed medium is used may be known ones. Specific examples of inorganic compounds as a dispersion stabilizer include calcium phosphate, magnesium phosphate, aluminum phosphate, zinc phosphate, calcium carbonate, magnesium carbonate, calcium hydroxide, magnesium hydroxide, aluminum hydroxide, calcium metasilicate, calcium sulfate, barium sulfate, bentonite, silica, and alumina. Examples of the organic compounds as a dispersion stabilizer include polyvinyl alcohol, gelatin, methylcellulose, methylhydroxypropylcellulose, ethylcellulose, carboxymethylcellulose sodium salt, polyacrylic acid and salts thereof, and starch. Those can be used by dispersing them in an aqueous phase. The concentration of the dispersion stabilizer is preferably 0.2 to 20 parts by mass with respect to 100 parts by mass of the liquid mixture or monomer composition.

The polymerization initiator used when the toner is produced by a suspension polymerization method may include known polymerization initiators. Specifically, the polymerization initiators exemplified as polymerization initiators that can be used in the production method of the above-mentioned hybrid resins.

The chain transfer agent that can be used when the toner is produced by the suspension polymerization method may be a known chain transfer agent.

For improving the flowability of the toner and achieving uniform charging of the toner, it is preferable that an inorganic fine powder be applied to a surface of the toner particles.

The inorganic fine powder preferably has a number average primary particle diameter of 4 to 80 nm. To make the charge distribution of toner particles more uniform, it is more preferable that the inorganic fine powder have a number average primary particle diameter of 6 to 35 nm. When the number average primary particle diameter of the inorganic powder is in the above-mentioned range, good flowability tends to be obtained and uniform charge tends to be obtained.

In the present invention, the number average primary particle diameter of the inorganic fine powder can be measured by counting 100 or more primary particles of inorganic fine powder that are present as attached on the surface of the toner particles or in a free state in a photograph of the toner taken by a scanning electron microscope in an magnified scale and calculating a number average particle diameter from the counts. Note that to perform measurement while confirming the type of the particles, measurement is performed referring to a photograph of the toner surface mapped with an element contained in the inorganic fine powder by an elemental analysis means such as XMA annexed to the scanning electron microscope.

The inorganic fine powders that can be used include inorganic fine powder selected from silica, alumina, and titania or double oxides thereof. The double oxides include, for example, aluminum silicate fine powder and strontium titanate fine powder. As the silicate fine powder, both dry silicas such as a so-called dry method silica or hummed silica and a so-called wet method silica that is produced from water glass or the like can be used. The dry silica, which contains less silanol groups on the surface and inside the silicate fine powder and less production residues such as $Na_2O$ and $SO_3^{2-}$ is more preferable than the others. In the case of dry silica, for example, other metal halide compounds such as aluminum chloride and titanium chloride may be used together with the silicon halide compound in the production process to provide complex fine powder derived from silica and other metal oxide compounds. The dry silica used in the present invention includes this.

The inorganic fine powder having a number average primary particle diameter of 4 to 80 nm is preferably added in an amount of 0.1 to 5.0 parts by mass with respect to 100 parts by mass of the toner particles. When the addition amount of the inorganic fine powder is less than 0.1 parts by mass, its effect is insufficient while it is more than 5.0 parts by mass, the fixability of the toner may be decreased.

While the inorganic fine powder is added for improving the flowability of the toner and for uniform charging of the toner particles, in a preferred embodiment, the inorganic fine powder may be subjected, for example, to a hydrophobizing treatment to adjust the charge quantity of the toner and impart the toner with the function of improving the environment stability.

When the inorganic fine powder that is added to the toner absorbs moisture, the charge quantity of the toner particles significantly decreases to readily cause scattering of the toner.

The hydrophobizing agent that hydrophobizes the inorganic fine powder that can be used include silicone varnishes, various denatured silicone varnishes, silicone oils, various denatured silicone oils, silane compounds, silane coupling agents, and other organosilicon compounds, organotitanium compounds and the like treating agents. Those can be used alone or in combination for the treatment.

Of those, those treated with the above-mentioned silicone oils are preferable. More preferably, use of the inorganic fine powder subjected to treatment with a silicone oil simultaneous with or after hydrophobizing treatment as a magnetic toner particle is advantageous for maintaining the charge quantity of the toner particles at high levels under high humidity conditions to prevent scattering of the toner.

Further, in a preferable embodiment, the toner may contain near-spherical inorganic fine particles or organic fine particles having a primary particle diameter of more than 30 nm (preferably having a specific surface area of less than 50 $m^2/g$), more preferably 50 nm (preferably having a specific surface area of 30 $m^2/g$). Specifically, for example, spherical silica particles, spherical polymethylsilsesquioxane particles, spherical resin particles and so on can be preferably used.

Further, the toner may contain other additives, for example, lubricant powders such as TEFLON (registered trademark) powder, zinc stearate powder, and polyvinylidene fluoride powder, polishing agents such as cerium oxide powder, silicon carbide powder, and strontium titanate powder, flowability imparting agents such as titanium oxide powder and aluminum oxide powder, caking preventing agents, or organic and/or inorganic fine particles of opposite polarity as development improving agents in small amounts as far as they give substantially no adverse influences.

Further, the toner of the present invention can be used either in admixture with a carrier as a two-component developer or as a single-component developer consisting of toner alone. In particular, when the toner is used as a nonmagnetic single-component developer for which charge rising property is important, the toner can exhibit such effect more significantly.

Example

Hereinafter, the present invention is explained concretely by way of examples. However, the present invention should not be construed as being limited to the examples. All parts used in the examples are by mass.

Analyzing appliances used in the examples are as follows.
FT-IR Spectrum
AVATAR 360 FT-IR, manufactured by Nicolet Corporation
$^1$H-NMR, $^{13}$C-NMR
FT-NMR JNM-EX400 manufactured by JEOL, Ltd. (solvent used: heavy chloroform)
Elemental Analysis
Elemental analysis apparatus EA-1108 manufactured by Carlo Erba (calculate amounts of C, O, S, and N)

<<Synthesis of Resin Component>>
<Production of Polyester PA>

In a reaction vessel equipped with a condenser, a stirrer, a thermometer, and a nitrogen inlet pipe were charged 66.1 parts of a 2 mole propylene oxide adduct of bisphenol A, 33.9 parts of dimethyl terephthalate, and 2.0 parts of potassium titanyl oxalate as a condensation catalyst and the mixture was allowed to react at 230° C. for 10 hours under nitrogen stream with distilling off water formed. Then, the reaction mixture was allowed to react under reduced pressure of 5 to 20 mmHg. The reaction mixture was take out when the hydroxyl value thereof reached 50 mgKOH/g or more to obtain a polyester resin. The polyester resin contained no THF-insoluble matter and had an acid value of 0 mgKOH/g, a hydroxyl value of 54 mgKOH/g, Tg of 54° C., Mn of 1,780, and Mw of 3,950.

To a solution of 20 parts of the obtained polyester resin dissolved in 80 parts of methoxybutyl acetate was dropwise added a mixture of 3.0 parts of 2-methacryloyloxyethyl isocyanate, 0.03 parts of dibutyltin laurate, and 10 parts of methoxybutyl acetate. The reaction was continued until the peak of isocyanate at 2,200 cm$^{-1}$ disappeared while the progress of reaction was being monitored by IR (infrared absorption spectrum). The reaction mixture was dropwise added to hexane to carry out purification by reprecipitation. After filtration, the residue was dried under reduced pressure to obtain a polyester resin PA having unsaturated bonds at both ends thereof.

<Production of Polyester PB>

In a reaction vessel equipped with a condenser, a stirrer, a thermometer, and a nitrogen inlet pipe were charged 26.6 parts of propylene glycol, 103.8 parts of terephthalic acid, 9.7 parts of adipic acid, 23.5 parts of maleic anhydride, and 2.0 parts of tetrastearyl titanate as a condensation catalyst and the mixture was allowed to react at 230° C. for 6 hours under nitrogen stream with distilling off generated water. Then, the reaction mixture was allowed to react under a reduced pressure of 5 to 20 mmHg for 8 hours to obtain an unsaturated polyester resin PB. The polyester resin PB contained no THF-insoluble matter and had an acid value of 15.0 mgKOH/g, a hydroxyl value of 61.0 mgKOH/g, Tg of 47.2° C., Mn of 1,900, and Mw of 3,900.

<Production of Hybrid Resin HA>

In a reaction vessel equipped with a condenser, a stirrer, a thermometer, and a nitrogen inlet pipe were charged 100 parts of xylene and 60 parts of polyester resin PB and the mixture was agitated at 50° C. under a nitrogen stream.

Then, the following monomers were mixed to prepare a monomer mixed liquid.

| | |
|---|---|
| 2-Ethylhexyl acrylate | 5.0 parts |
| Styrene | 27.5 parts |
| Acrylic acid | 7.5 parts |

Further, the monomer mixed liquid was mixed with 1.6 parts of t-butyl peroxyisopropylmonocarbonate (Perbutyl I, manufactured by NOF CORPORATION.) as a polymerization initiator and the mixture was dropped to the reaction vessel and the temperature was elevated to 120 to 125° C. Under reflux conditions, the reaction mixture was stirred for 6 hours and cooled to room temperature. Thereafter, the polymerization solution was dropwise added to 600 parts of hexane to perform reprecipitation for purification and the obtained polymer was washed with 200 parts of hexane twice. After filtration, the residue was dried at 40° C. under reduced pressure to obtain resin powder. This was named hybrid resin HA. The hybrid resin HA contained no THF-insoluble matter and had an acid value of 73.4 mgKOH/g, a hydroxyl value of 36.6 mgKOH/g, Tg of 53.5° C., Mn of 2,800, and Mw of 7,900.

<Production of Polyester Resin PC>

In a reaction vessel equipped with a condenser, a stirrer, a thermometer, and a nitrogen inlet pipe were charged 70.0 parts of 2 mole propylene oxide adduct of bisphenol A, 25.0 parts of terephthalic acid, 5.0 parts of trimellitic anhydride, and 2.0 parts of potassium titanyl oxalate and the mixture was allowed to react at 230° C. for 10 hours under nitrogen stream with distilling off generated water. Then, the reaction mixture was allowed to react under reduced pressure of 5 to 20 mmHg. The polymer was taken out when the acid value reached 25 to obtain a polyester resin PC. The polyester resin PC contained 9.0 mass % of a THF-insoluble matter and had an acid value of 24.5 mgKOH/g, a hydroxyl value of 33.0 mgKOH/g, Tg of 64° C., Mn of 4,700, and Mw of 36,200.

<Production of Polyester Resin PD>

In a reaction vessel equipped with a condenser, a stirrer, a thermometer, and a nitrogen inlet pipe were charged 67.8 parts of terephthalic acid, 15.2 parts of ethylene glycol, and 17.0 parts of neopentyl glycol, and the mixture was heated at 260° C. for 4 hours to perform an esterification reaction. Then, 2.41 parts of an ethylene glycol solution containing 1.0 mass % of antimony trioxide as a catalyst was added to the reaction mixture and the temperature of the system was elevated to 280° C. and the pressure of the system was gradually decreased to 13 Pa after 1.5 hours. Under the conditions, the polycondensation reaction was further continued. After 2 hours, the pressure of the system was made normal with nitrogen gas and the temperature of the system was lowered. When the temperature reached 270° C., 7.7 parts of trimellitic acid and 3.4 parts of isophthalic acid were added to the reaction mixture, which was then stirred at 250° C. for 1 hour to perform polymerization reaction. Thereafter, the reaction mixture was sufficiently cooled to room temperature and then the polymer was taken out to obtain a polyester resin PD. The polyester resin PD contained no THF-insoluble matter and had an acid value of 83.6 mgKOH/g, a hydroxyl value of 0.7 mgKOH/g, Tg of 63.2° C., Mn of 1,850, and Mw of 5,900.

<Production of Polyester Resin PE>

In a reaction vessel equipped with a condenser, a stirrer, a thermometer, and a nitrogen inlet pipe were charged 70.0 parts of 2 mole propylene oxide adduct of bisphenol A, 20.0 parts of terephthalic acid, 10.0 parts of 5-sulfoisophthalic acid, and 2.0 parts of potassium titanyl oxalate as a condensation catalyst and the mixture was allowed to react at 230° C. for 10 hours under nitrogen stream with distilling off generated water. Then, the reaction mixture was allowed to react under reduced pressure of 5 to 20 mmHg. The polymer was taken out when the acid value reached 35 mgKOH/g to obtain a polyester resin PE. The polyester resin PE had an acid value of 35.0 mgKOH/g, a hydroxyl value of 35.0 mgKOH/g, Tg of 65.2° C., Mn of 4,300, and Mw of 28,000.

<Production of Polyester Resin PF>

In a reaction vessel equipped with a condenser, a stirrer, a thermometer, and a nitrogen inlet pipe were charged 56.0 parts of 2 mole propylene oxide adduct of bisphenol A, 10.0 parts of 1-amino-2-hydroxy-4-naphthalenesulfonic acid, 25.0 parts of terephthalic acid, 5.0 parts of trimellitic anhydride, and 2 parts of potassium titanyl oxalate as condensation catalyst and the mixture was allowed to react at 230° C. for 10 hours under nitrogen stream with distilling off generated water. Then, the reaction mixture was allowed to react under reduced pressure of 5 to 20 mmHg. The polymer was taken out when the acid value reached 48 mgKOH/g to obtain a polyester resin PF. The polyester resin PF contained 6.0 mass % of THF-insoluble matter and had an acid value of 47.4 mgKOH/g, a hydroxyl value of 27.0 mgKOH/g, Tg of 65° C., Mn of 4,600, and Mw of 22,700.

<<Production of Sulfonic Ester Group-Containing Resin>>

Synthesis of resins for toner (toner resins) S1 to S9 was performed by the following methods.

<Production of Toner Resin S1>

In a reaction vessel equipped with a condenser, a stirrer, a thermometer, and a nitrogen inlet pipe were charged 100 parts of xylene and 70 parts of the polyester resin PA and the mixture was stirred at 50° C. under a nitrogen stream.

Then, the following monomers were mixed to prepare a monomer mixed liquid.

| Methyl 2-acrylamidebenzenesulfonate | 7.5 parts |
| Styrene | 18.0 parts |
| n-Butyl acrylate | 4.5 parts |

The monomer mixed liquid was further mixed with 1.8 parts of t-butyl peroxyisopropylmonocarbonate (Perbutyl I, manufactured by NOF CORPORATION.) as a polymerization initiator and the mixture was dropped into the above-mentioned reaction vessel. The temperature of the resultant mixture was elevated to 120 to 125° C. The mixture was stirred under reflux conditions for 4 hours and then cooled to room temperature. Thereafter, the polymerized solution was dropwise added to 600 parts of hexane to perform reprecipitation for purification and the obtained polymer was washed with 200 parts of hexane twice. After filtration, the residue was dried at 40° C. under reduced pressure to obtain resin powder having a slightly yellow color. This was named toner resin S1.

Analysis of structure indicated that the structure including the aryl group having a sulfonic ester group as a substituent and a linking group contained in the toner resin S1 was as follows. Further, results of measurement of sulfur content by combustion ion chromatography confirmed that the content of sulfonic ester group was 0.31 mmol/g.

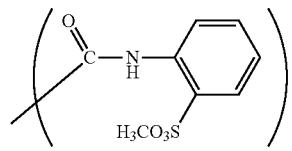

<Production of Toner Resin S2>

In a reaction vessel equipped with a condenser, a stirrer, a thermometer, and a nitrogen inlet pipe were charged 200 parts of tetrahydrofuran and the mixture was stirred under a nitrogen stream.

Then, the following monomers were mixed to prepare a monomer mixed liquid.

| Methyl 2-acrylamidebenzenesulfonate | 13.0 parts |
| Styrene | 66.0 parts |
| Acrylic acid | 1.0 parts |

20 parts of the polyester resin PA was dissolved in the monomer mixed liquid and further 3.0 parts of 2,2'-azobis(2,4-dimethylvaleronitrile) was mixed. The resultant was dropped to the above-mentioned reaction vessel while being stirred and retained for 10 hours. Thereafter, the mixture was evaporated to distill off the solvent and the residue was dried at 50° C. under reduced pressure. The obtained solids were pulverized to obtain a toner resin S2.

Analysis of the structure of the resin for toner S2 indicated that the structure including the aryl group having a sulfonic ester group as a substituent and a linking group contained in the resin for toner S2 was as follows.

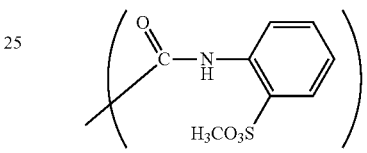

<Production of Resin for Toner S3>

In a reaction vessel equipped with a condenser, a stirrer, a thermometer, and a nitrogen inlet pipe were charged 100 parts of the hybrid resin HA and 133 parts of 4-metoxyaniline-2-sulfonic acid and further 380 parts of pyridine. After the mixture was stirred, 406 parts of triphenyl phosphite was added and the mixture was heated at 120° C. for 6 hours. After completion of the reaction, the product was reprecipitated in 500 parts of ethanol and recovered. The obtained polymer was washed twice with 200 parts of 1 mol/l hydrochloric acid and then washed twice with 200 parts of water. The residue was dried under reduced pressure. Results of IR measurement indicated that the peak at 1,695 $cm^{-1}$ attributable to a carboxylic acid decreased as compared to the measurement in the case of the hybrid resin HA and a new peak attributable to an amide bond appeared at 1,658 $cm^{-1}$. In addition, results of $^{1}$H-NMR indicated that the peak attributable to the methoxy group of 4-methoxyaniline-2-sulfonic acid shifted, confirming that the obtained polymer contained a sulfonic acid group. Further, results of measurement of sulfur content by combustion ion chromatography confirmed that the content of sulfonic acid group was 0.62 mmol/g.

Further, in a reaction vessel equipped with a condenser, a stirrer, a thermometer, and a nitrogen inlet pipe was charged 400 parts of trimethyl orthoformate and heated at 80° C. To this was added 100 parts of the obtained polymer in 5 minutes, and then the mixture was stirred for 15 hours. Thereafter, the reaction mixture was dropwise added to 9,000 parts of hexane while being stirred. After standing for a while, a resin was allowed to deposit and precipitate. The supernatant was removed by decantation, and 500 parts of chloroform was added to the residue to dissolve it. The resultant was dropwise added to 7,500 parts of hexane while being stirred and allowed to deposit and precipitate. After removing the supernatant by decantation, the residue was dried under reduced pressure. The resultant was washed with 300 parts of methanol and then with 300 parts of water. The residue was dried under reduced pressure to obtain a toner resin S3.

Analysis of the structure of the toner resin S3 indicated that the structure including the aryl group having a sulfonic ester group as a substituent and a linking group contained in the toner resin S3 was as follows.

Note that while the content of sulfonic ester group was 0.52 mmol/g, this was obtained by measuring an acid value attributable to the sulfonic acid group of the toner resin S3 and obtaining a difference in acid value from the acid value attributable to sulfonic acid group of the compound before the esterification.

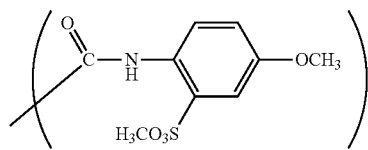

<Production of Toner Resin S4>

A toner resin S4 was obtained in the same manner as in the production example of toner resin S3 except that 800 parts of triethyl orthoformate was used instead of 400 parts of trimethyl orthoformate.

Analysis of the structure of the toner resin S4 indicated that the structure including the aryl group having a sulfonic ester group as a substituent and a linking group contained in the toner resin S4 was as follows.

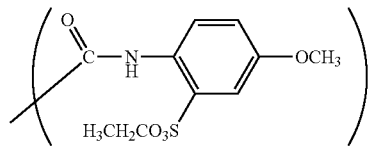

<Production of Toner Resin S5>

In a reaction vessel equipped with a condenser, a stirrer, a thermometer, and a nitrogen inlet pipe were charged 100 parts of the hybrid resin HA and 147 parts of 2-amino-1-naphthalenesulfonic acid and further 380 parts of pyridine. After the mixture was stirred, 406 parts of triphenyl phosphite was added and the mixture was heated at 120° C. for 6 hours. After completion of the reaction, the product was reprecipitated in 500 parts of ethanol and recovered. The obtained polymer was washed twice with 200 parts of 1 mol/l hydrochloric acid and then washed twice with 200 parts of water. The residue was dried under reduced pressure. Results of IR measurement indicated that the peak at 1,695 cm$^{-1}$ attributable to a carboxylic acid decreased and a new peak attributable to an amide bond appeared at 1,658 cm$^{-1}$. In addition, results of $^1$H-NMR indicated that the peak attributable to the naphthyl group of 2-amino-1-naphthalenesulfonic acid shifted, confirming that the obtained polymer contained a sulfonic acid unit.

Further, in a reaction vessel equipped with a condenser, a stirrer, a thermometer, and a nitrogen inlet pipe was charged 100 parts of the obtained polymer, and 3,500 parts of chloroform and 800 parts of methanol were added thereto to dissolve the polymer, followed by cooling the solution to 0° C. To this was added 75 parts of 2 mol/l trimethylsilyldiazomethane-hexane solution (manufactured by Aldrich Corporation) and the mixture was stirred for 4 hours. Thereafter, the solvent was removed by distillation.

2,500 parts of toluene and 1,000 parts of methyl ethyl ketone were added to the residue to redissolve the polymer and the solvent was removed by distillation. The operation of redissolution/distillation was repeated three times and the residue was dried at 50° C. under reduced pressure. The obtained solids were pulverized to obtain a toner resin S5.

Analysis of the structure of the toner resin S5 indicated that the structure including the aryl group having a sulfonic ester group as a substituent and a linking group contained in the toner resin S5 was as follows:

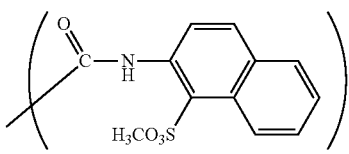

<Production of Toner Resin S6>

In a reaction vessel equipped with a condenser, a stirrer, a thermometer, and a nitrogen inlet pipe were charged 100 parts of the polyester resin PC and parts of 4-aminobenzenesulfonic acid and further 380 parts of pyridine. After the mixture was stirred, 135 parts of triphenyl phosphite was added and the mixture was heated at 120° C. for 6 hours. After completion of the reaction, the product was reprecipitated in 500 parts of ethanol and recovered. The obtained polymer was washed twice with 200 parts of 1 mol/l hydrochloric acid and then washed twice with 200 parts of water. The residue was dried under reduced pressure. Results of IR measurement indicated that the peak at 1,695 cm$^{-1}$ attributable to a carboxylic acid decreased and a new peak attributable to an amide bond appeared at 1,658 cm$^{-1}$. In addition, results of $^1$H-NMR indicated that the peak attributable to the aromatic ring of 4-aminobenzenesulfonic acid shifted, confirming that the obtained polymer contained a sulfonic acid unit.

Further, in a reaction vessel equipped with a condenser, a stirrer, a thermometer, and a nitrogen inlet pipe was charged 800 parts of trimethyl orthoformate and heated at 80° C. To this was added 100 parts of the obtained polymer in 5 minutes, and then the mixture was stirred for 15 hours. Thereafter, the reaction mixture was dropwise added to 9,000 parts of hexane while being stirred. After standing for a while, a resin was allowed to deposit and precipitate. The supernatant was removed by decantation, and 500 parts of chloroform was added to the residue to dissolve it. The resultant was dropped in 7,500 parts of hexane while being stirred and allowed to deposit and precipitate. After removing the supernatant by decantation, the residue was dried under reduced pressure. The resultant was washed with 300 parts of methanol and then with 300 parts of water. The residue was dried under reduced pressure to obtain a toner resin S6.

Analysis of the structure of the toner resin S6 indicated that the structure including the aryl group having a sulfonic ester group as a substituent and a linking group contained in the toner resin S6 was as follows:

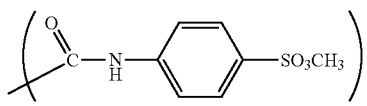

<Production of Toner Resin S7>

In a reaction vessel equipped with a condenser, a stirrer, a thermometer, and a nitrogen inlet pipe were charged 100 parts of the polyester resin PD and 140 parts of 4-aminotoluene-3-sulfonic acid and further 380 parts of pyridine. After the mixture was stirred, 463 parts of triphenyl phosphite was added and the mixture was heated at 120° C. for 6 hours. After completion of the reaction, the product was reprecipitated in 500 parts of ethanol and recovered. The obtained polymer was washed twice with 200 parts of 1 mol/l hydrochloric acid and then washed twice with 200 parts of water. The residue was dried under reduced pressure. Results of IR measurement indicated that the peak at 1,695 cm$^{-1}$ attributable to a carboxylic acid decreased and a new peak attributable to an amide bond appeared at 1,658 cm$^{-1}$. In addition, results of $^1$H-NMR indicated that the peak attributable to the methyl group of 4-aminotoluene-3-sulfonic acid shifted, confirming that the obtained polymer contained a sulfonic acid unit.

Further, in a reaction vessel equipped with a condenser, a stirrer, a thermometer, and a nitrogen inlet pipe was charged 100 parts of the obtained polymer, and 3,500 parts of chloroform and 800 parts of methanol were added thereto to dissolve the polymer, followed by cooling the solution to 0° C. To this was added 75 parts of 2 mol/l trimethylsilyldiazomethane-hexane solution (manufactured by Aldrich Corporation) and the mixture was stirred for 4 hours. Thereafter, the solvent was removed by distillation.

2,500 parts of toluene and 1,000 parts of methyl ethyl ketone were added to the residue to redissolve the polymer and the solvent was removed by distillation. The operation of redissolution/distillation was repeated three times and the residue was dried at 50° C. under reduced pressure. The obtained solids were pulverized to obtain a toner resin S7.

Analysis of the structure of the toner resin S7 indicated that the structure including the aryl group having a sulfonic ester group as a substituent and a linking group contained in the toner resin S7 was as follows:

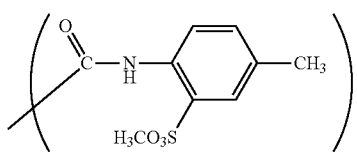

<Production of Toner Resin S8>

In a reaction vessel equipped with a condenser, a stirrer, a thermometer, and a nitrogen inlet pipe was charged 400 parts of trimethyl orthoformate and heated at 80° C. To this was added 100 parts of the polyester resin PE in 5 minutes, and then the mixture was stirred for 15 hours. Thereafter, the reaction mixture was dropwise added to 9,000 parts of hexane while being stirred. After standing for a while, a resin was allowed to deposit and precipitate. The supernatant was removed by decantation, and 500 parts of chloroform was added to the residue to dissolve it. The resultant was dropwise added to 7,500 parts of hexane while being stirred and allowed to deposit and precipitate. After removing the supernatant by decantation, the residue was dried under reduced pressure. The resultant was washed with 300 parts of methanol and then with 300 parts of water. The residue was dried under reduced pressure to obtain a toner resin S8.

Analysis of the structure of the toner resin S8 indicated that the structure including the aryl group having a sulfonic ester group as a substituent and a linking group contained in the toner resin S8 was as follows.

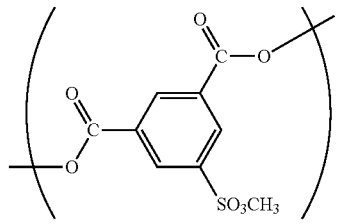

<Production of Toner Resin S9>

In a reaction vessel equipped with a condenser, a stirrer, a thermometer, and a nitrogen inlet pipe was charged 400 parts of trimethyl orthoformate and heated at 80° C. To this was added 100 parts of the polyester resin PF in 5 minutes, and then the mixture was stirred for 15 hours. Thereafter, the reaction mixture was dropwise added to 9,000 parts of hexane while being stirred. After standing for a while, a resin was allowed to deposit and precipitate. The supernatant was removed by decantation, and 500 parts of chloroform was added to the residue to dissolve it. The resultant was dropwise added to 7,500 parts of hexane while being stirred and allowed to deposit and precipitate. After removing the supernatant by decantation, the residue was dried under reduced pressure. The resultant was washed with 300 parts of methanol and then with 300 parts of water. The residue was dried under reduced pressure to obtain a toner resin S9.

Analysis of the structure of the toner resin S9 indicated that the structure including the aryl group having a sulfonic ester group as a substituent and a linking group contained in the toner resin S9 was as follows.

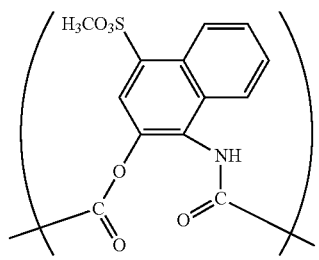

<Production of St/2EHA/AMPS Copolymer (for Comparative Example)>

In a reaction vessel equipped with a condenser, a stirrer, a thermometer, and a nitrogen inlet pipe were charged 67 parts of methanol, 50 parts of toluene, and 83 parts of methyl ethyl ketone and the mixture was refluxed under a nitrogen stream.

Then, the following monomers were mixed to the resultant to prepare a monomer mixed liquid.

| | |
|---|---|
| 2-Acrylamide-2-methylpropanesulfonic acid | 6.0 parts |
| Styrene | 81.0 parts |
| 2-Ethylhexyl acrylate | 13.0 parts |

To this mixed liquid was added 5.0 parts of dimethyl-2,2′-azobis(2-methylpropionate) as a polymerization initiator. The resultant mixture was dropped in the above-mentioned reaction vessel while being stirred and retained for 10 hours. Thereafter, the solvent was removed by distillation and the residue was dried at 50° C. under reduced pressure. The obtained solids were pulverized to obtain an St/2EHA/AMPS copolymer. This resin had an acid value of 28.0 mgKOH/g, a hydroxyl value of 0 mgKOH/g, Tg of 63.1° C., Mn of 10,700, and Mw of 24,000.

Table 1 shows components and contents of the polyester unit and contents of sulfonic ester group and total sulfonic functional group (sum of sulfonic acid group and sulfonic ester group) relating to the toner resins S1 to S9 thus prepared and Table 2 shows results of acid values, molecular weights, and Tg measured by the above-mentioned methods.

TABLE 2

| Toner resin | Acid value (mgKOH/g) | Molecular weight Mw | Molecular weight Mw/Mn | Tg (° C.) |
|---|---|---|---|---|
| S1 | 2.2 | 12,000 | 5.5 | 55.1 |
| S2 | 7.5 | 7,300 | 2.8 | 67.2 |
| S3 | 12.5 | 8,000 | 2.8 | 54.5 |
| S4 | 9.2 | 8,050 | 2.8 | 54.0 |
| S5 | 2.2 | 7,900 | 2.8 | 53.8 |
| S6 | 2.3 | 36,500 | 7.8 | 63.8 |
| S7 | 7.5 | 6,100 | 3.4 | 61.4 |
| S8 | 5.2 | 28,000 | 6.5 | 65.2 |
| S9 | 5.9 | 22,700 | 4.9 | 62.7 |

TABLE 1

| Toner resin | Type of resin | Polyester unit components (molar ratio) Polyhydric alcohol component | Polyester unit components (molar ratio) Polycarboxylic acid component | Polyester unit content (mass %) | Sulfonic ester group content (mmol/g) | Total sulfonic functional group content (mmol/g) |
|---|---|---|---|---|---|---|
| S1 | Hybrid resin | BPA-PO 100.0 | Dimethyl terephthalate 91.2 | 70 | 0.31 | 0.31 |
| S2 | Hybrid resin | BPA-PO 100.0 | Dimethyl terephthalate 91.2 | 20 | 0.54 | 0.54 |
| S3 | Hybrid resin | Propylene glycol 100.0 | Terephthalic acid/ Adipic acid/ Maleic anhydride 103.8/9.7/23.5 | 60 | 0.52 | 0.62 |
| S4 | Hybrid resin | Propylene glycol 100.0 | Terephthalic acid/ Adipic acid/ Maleic anhydride 103.8/9.7/23.5 | 60 | 0.55 | 0.62 |
| S5 | Hybrid resin | Propylene glycol 100.0 | Terephthalic acid/ Adipic acid/ Maleic anhydride 103.8/9.7/23.5 | 60 | 0.39 | 0.41 |
| S6 | Polyester resin | BPA-PO 100.0 | Terephthalic acid/ Trimellitic anhydride 74.0/11.7 | 100 | 0.18 | 0.21 |
| S7 | Polyester resin | Neopentyl glycol/ Ethylene glycol 40.0/60.0 | Terephthalic acid/Isophthalic acid/Trimellitic acid 100.0/5.0/9.0 | 100 | 1.05 | 1.10 |
| S8 | Polyester resin | BPA-PO 100.0 | Terephthalic acid (/5-sulfoisophthalic acid) 59.2(/20.1) | 100 | 0.37 | 0.41 |
| S9 | Polyester resin | BPA-PO(/AHNS) 79.8 (/20.4) | Terephthalic acid/ Trimellitic anhydride 74.0/11.7 | 100 | 0.36 | 0.41 |

BPA-PO: 2-mole propylene oxide adduct of bisphenol A
AHNS: 1-amino-2-hydroxy-4-naphthalenesulfonic acid <<Production of Toner>>

Toners 1 to 11 were produced by the following methods.

<Production of Toner 1>

Preparation of Pigment Dispersed Paste:

| Styrene monomer | 80 parts |
| Cu phthalocyanine (Pigment Blue 15:3) | 13 parts |

The above-mentioned materials were well premixed in a vessel and the resultant was dispersed with a bead mill for about 4 hours while being kept at 20° C. or lower to prepare a pigment-dispersed paste.

Preparation of Toner Particles:

To 1,150 parts of deionized water was added 390 parts of a 0.1 mol/l $Na_3PO_4$ aqueous solution and the resultant mixture was heated to 60° C. Then the mixture was stirred using a CLEARMIX (manufactured by Mtechnique Corporation) at 11,000 rpm. To the resultant was gradually added 58 parts of a 1.0 mol/l $CaCl_2$ aqueous solution to obtain a dispersion medium containing $Ca_3(PO_4)_2$.

| The above-mentioned pigment dispersed paste | 46.5 parts |
| Styrene monomer | 42.0 parts |
| n-Butyl acrylate | 18.0 parts |
| Ester wax | 13.0 parts |
| (Main component $C_{19}H_{39}COOC_{20}H_{41}$, melting point 68.6° C.) | |
| Saturated polyester resin | 5.0 parts |
| (Terephthalic acid-propylene oxide modified bisphenol A copolymer, acid value 15 mgKOH/g, Mw 18,000) | |
| Toner resin S1 | 1.5 parts |

These were heated to 60° C., dissolved and dispersed to form a monomer mixture. 3.0 parts of 2,2'-azobis(2,4-dimethylvaleronitrile) as a polymerization initiator was added to the monomer mixture for dissolution while the monomer mixture being kept at 60° C., to thereby prepare a monomer composition.

The monomer composition was charged to the above-mentioned dispersion medium. At 60° C. in a nitrogen atmosphere, the mixture was stirred using a CLEARMIX at 10,000 rpm for 20 minutes and granulated. Thereafter, the resultant particles were allowed to react at 60° C. for 5 hours while being stirred using a paddle stirring vane, followed by stirring at 80° C. for hours to complete the polymerization. After the particles were cooled to room temperature, hydrochloric acid was added thereto to dissolve $Ca_3(PO_4)_2$, and the powders were filtered, washed and dried and further classified to obtain toner particles.

Preparation of Toners:

To 100 parts of the obtained toner particles was mixed and externally added 1 part of hydrophobic silica fine powder having a number average primary particle diameter of 9 nm and a BET specific surface area of 180 m²/g, which was obtained by treating the surface thereof with hexamethyldisilazane and subsequently with silicone oil, by using a Henschel mixer (manufactured by Mitsui Miike Chemical Engineering Machine Co., Ltd.), to thereby obtain a toner 1.

<Production of Toner 2>

A toner 2 was obtained in the same manner as in the production example of toner 1 except that the toner resin S2 was used instead of the toner resin S1.

<Production of Toner 3>

Preparation of Pigment Dispersed Paste:

| Styrene monomer | 80 parts |
| Carbon black (Printex 35, manufactured by Degussa AG) | 13 parts |

The above-mentioned materials were well premixed in a vessel and the resultant was dispersed with a bead mill for about 4 hours while being kept at 20° C. or lower to prepare a pigment-dispersed paste.

Preparation of Toner Particles:

To 1,200 parts of deionized water was added 350 parts of a 0.1 mol/l $Na_3PO_4$ aqueous solution and the resultant mixture was heated to 60° C. Then the mixture was stirred using a TK-type Homomixer (manufactured by PRIMIX Corporation) at 11,000 rpm. To the resultant was gradually added 52 parts of a 1.0 mol/l $CaCl_2$ aqueous solution to obtain a dispersion medium containing $Ca_3(PO_4)_2$.

| The above Pigment dispersed paste | 46.5 parts |
| Styrene monomer | 38.0 parts |
| n-Butyl acrylate | 22.0 parts |
| Hydrocarbon wax | 10.0 parts |
| (Mw 1850, Mw/Mn 1.27, melting point 78.6° C.) | |
| Toner resin S3 | 3.0 parts |

These were heated to 60° C., dissolved and dispersed to form a monomer mixture. 5 parts of 2,2'-azobis(2,4-dimethylvaleronitrile) as a polymerization initiator was added to the monomer mixture for dissolution while the monomer mixture being kept at 60° C., to thereby prepare a monomer composition.

The monomer composition was charged to the above-mentioned dispersion medium. At 60° C. in a nitrogen atmosphere, the mixture was stirred using a CLEARMIX at 10,000 rpm for 20 minutes and granulated. Thereafter, the resultant particles were allowed to react at 60° C. for 5 hours while being stirred using a paddle stirring vane, followed by stirring at 80° C. for hours to complete the polymerization. After the particles were cooled to room temperature, hydrochloric acid was added thereto to dissolve $Ca_3(PO_4)_2$, and the powders were filtered, washed and dried and further classified to obtain toner particles. Then, the hydrophobic silica fine powder was externally added in the same manner as in the production example of toner 1 to obtain a toner 3.

<Production of Toner 4>

A toner 4 was obtained in the same manner as in the production example of toner 3 except that 10.0 parts of the toner resin S4 was used instead of 3.0 parts of the toner resin S3.

<Production of Toner 5>

Preparation of Toner Composition Mixed Liquid:

Propylene oxide adduct of bisphenol A/ethylene oxide adduct of bisphenol A/terephthalic acid copolymer

| polyester resin | 100.0 parts |
| (Tg 62° C., softening point 102° C., Mw 21,000) | |
| Cu phthalocyanine (Pigment Blue 15:3) | 5.0 parts |
| Hydrocarbon wax | 8.0 parts |
| (Mw 1,850, Mw/Mn 1.27, melting point 78.6° C.) | |
| Toner resin S5 | 5.0 parts |
| Ethyl acetate | 100.0 parts |

The above-mentioned materials were well premixed in a vessel and the resultant was dispersed with a bead mill while being kept at 20° C. or lower for about 4 hours to prepare a toner composition mixed liquid.

Preparation of Toner Particles:

To 240 parts of deionized water was charged 78 parts of a 0.1 mol/l $Na_3PO_4$ aqueous solution and the resultant mixture was heated to 60° C. Then, the mixture was stirred using A TK-type Homomixer (manufactured by Primix Corporation) at 11,000 rpm. To the resultant was gradually added 12 parts of a 1.0 mol/l $CaCl_2$ aqueous solution to obtain a dispersion medium containing $Ca_3(PO_4)_2$. Further, 1.0 part of carboxymethylcellulose (trade name: CELLOGEN BS-H, manufactured by Daiichi Kogyo Seiyaku Co., Ltd.) was added to the dispersion medium and the mixture was stirred for 10 minutes.

The dispersed medium prepared in the vessel of the above-mentioned homomixer was adjusted to 30° C. and while it was being stirred, 180 parts of the toner composition mixed liquid adjusted to 30° C. was charged, followed by stirring for 1 minute. Then, the stirring was stopped to obtain a toner composition-dispersed suspension. While the obtained toner composition-dispersed suspension was stirred, the gas phase on the surface of the suspension was forcibly renewed using a local exhaust apparatus at 40° C. constant, and the suspension was retained as it was for 17 hours to remove the solvent. After the residue was cooled to room temperature, hydrochloric acid was added thereto to dissolve $Ca_3(PO_4)_2$, and the residue was filtered, washed, dried, and further classified to obtain toner particles. Then, in the same manner as in the production example of toner 1, the hydrophobic silica fine powder was externally added to the toner particles to obtain a toner 5.

<Production of Toner 6>

Toner 6 was obtained in the same manner as in the production example of toner 5 except that 10.0 parts of the toner resin S6 was used instead of 5.0 parts of the toner resin S5.

<Production of Toner 7>

Production of Resin Dispersion:

| Styrene | 370 parts |
| n-Butyl acrylate | 30 parts |
| Acrylic acid | 6 parts |
| Dodecanethiol | 24 parts |
| Carbon tetrabromide | 4 parts |

A mixed liquid of the above composition was dispersed and emulsified in a solution prepared by dissolving 6 parts of a nonionic surfactant (Nonipol 400, manufactured by Sanyo Chemical Industries, Ltd.) and 10 parts of an anionic surfactant (Neogen SC, manufactured by Daiichi Kogyo Seiyaku Co., Ltd.) in 550 parts of deionized water in a flask, and while the resultant was mixed slowly for 10 minutes, 50 parts of deionized water having dissolved therein 4 parts of ammonium persulfate was charged in the flask and nitrogen purge was performed. Thereafter, the flask was heated in an oil bath until the contents reached 70° C. while the contents of the flask were stirred and emulsion polymerization was continued in this state for 5 hours. As a result, there was obtained a resin dispersion having a center diameter of 155 nm, a glass transition temperature of 59° C., and a Mw of 12,000.

Production of Toner Resin S3 Dispersion:

40 parts of the toner resin S3 was added to 360 parts of deionized water and the mixture was heated to 90° C. Then the mixture was adjusted to pH=7 with 5% ammonia water, and the mixture was stirred using a Ultra Turrax T-50 (manufactured by IKA) at 8,000 rpm while 0.8 part of a 10% aqueous solution of dodecylbenzenesulfonic acid was added, to thereby prepare a dispersion of toner resin S3 having a center diameter of 200 nm.

Preparation of Pigment Dispersion:

The following composition was mixed and dissolved, and dispersed with a homogenizer (IKA Ultra Turrax) and by ultrasonic irradiation, to thereby obtain a blue pigment dispersion having a center particle diameter of 150 nm.

| Cyan pigment C. I. Pigment Blue 15:3 | 50 parts |
| Anionic surfactant (Neogen SC, manufactured by Daiichi Kogyo Seiyaku Co., Ltd.) | 5 parts |
| Deionized water | 200 parts |

Preparation of Release Agent Dispersion:

The following composition was mixed and heated at 97° C., and then dispersed using a Ultra Turrax T-50 manufactured by IKA. Thereafter, the dispersion was subjected to dispersion treatment using a Gaulin homogenizer (manufactured by Meiwa Fosis Co., Ltd.) and treated 20 times under the conditions of 105° C. and 550 kg/cm², to thereby obtain a release agent dispersion having a center diameter of 190 nm.

| Hydrocarbon wax (Mw 1,850, Mw/Mn 1.27, melting point 78.6° C.) | 100 parts |
| Anionic surfactant (Neogen SC, manufactured by Daiichi Kogyo Seiyaku Co., Ltd.) | 5 parts |
| Deionized water | 300 parts |

Production of toner particles:

| The above-mentioned resin dispersion | 200 parts |
| The above-mentioned pigment dispersion | 30 parts |
| The above-mentioned release agent dispersion | 30 parts |
| Sanisol B50 (manufactured by Kao, Ltd.) | 1.5 parts |

These were mixed and dispersed in a round type stainless steel flask using a Ultra Turrax T-50, and then the dispersion was heated to 48° C. in an oil bath for heating while the contents of the flask were stirred. After the resultant was retained at 48° C. for minutes, observation of the mixture using an optical microscope confirmed the formation of agglomerated particles of about 5 µm. To this was gently added 60 parts of the toner resin S3 dispersion and the temperature of the oil bath for heating was elevated to 50° C. and the resultant mixture was retained at this temperature for 1 hour. Observation of the product on an optical microscope confirmed the formation of agglomerated particles of about 5.6 µm. Thereafter, 3 parts of Neogen SC was added to the resultant and then the stainless steel flask was sealed. The product was heated to 105° C. while being continuously stirred using a magnetic seal and retained for 3 hours. After cooling, the resultant was filtered, sufficiently washed with deionized water, and dried, and further classified to obtain toner particles. Then, hydrophobic silica fine powder was externally added to the obtained toner particles in the same manner as in the production example of toner 1 to obtain a toner 7.

<Production of Toner 8>

A toner 8 was obtained in the same manner as in the production example of toner 7 except that the toner resin S9 was used instead of the toner resin S3.

<Production of Toner 9>

A toner 9 was obtained in the same manner as in the production example of toner 1 except that the polyester PE was used instead of the toner resin S1.

<Production of Toner 10>

A toner 10 was obtained in the same manner as in the production example of toner 1 except that the St/2EHA/AMPS copolymer was used instead of the toner resin S1.

<Production of Toner 11>

A toner 11 was obtained in the same manner as in the production example of toner 1 except that 1.0 part of a zinc complex of 3,5-di-tert-butyl salicylic acid was used instead of 1.5 parts of the toner resin S1.

The above-mentioned toners 1 to 11 were measured for weight average particle diameter (D4) and circularity by the above-mentioned methods, and further DSC measurement was performed. Table 3 shows the results.

Printing Test Method

By using a commercially available full color laser beam printer (LBP-5500, manufactured by Canon, Inc.), 200 g of a toner was filled in a developing device and continuous printing test of 10,000 sheets was performed in a normal temperature and normal humidity environment (23.5° C., 60% RH). Further, the printer was moved to an environment under high temperature and high humidity conditions (30° C., 80% RH) and left to stand for 24 hours. Then, continuous printing test of 5,000 sheets was performed. During the printing tests, fifth sheet was defined initial, 10,000-th sheet was defined as after endurance running, and 15,000-th sheet was defined after severe endurance running and charge amount of toner on toner carrier, image density, and fog density at each time were measured. In these tests, the printing speed was set to 17 sheets/minute of A4 wide (A4 plain paper of 75 g/m$^2$), and the print ratio of each color to paper area was set to 2%.

TABLE 3

| | | Charge control compound | | Weight | | DSC Measurement | |
|---|---|---|---|---|---|---|---|
| | | Kind | Addition amount (mass part) | average particle diameter (μm) | Average circularity | Maximum heat absorption peak temperature (° C.) | Glass transition temperature (° C.) |
| Example | Toner 1 | Toner resin S1 | 1.5 | 6.24 | 0.983 | 68.8 | 58.2 |
| | Toner 2 | Toner resin S2 | 1.5 | 6.31 | 0.980 | 68.8 | 58.0 |
| | Toner 3 | Toner resin S3 | 3.0 | 6.18 | 0.981 | 73.8 | 57.3 |
| | Toner 4 | Toner resin S4 | 10.0 | 5.83 | 0.986 | 73.8 | 57.9 |
| | Toner 5 | Toner resin S5 | 5.0 | 6.55 | 0.980 | 74.1 | 59.8 |
| | Toner 6 | Toner resin S6 | 10.0 | 6.65 | 0.978 | 74.1 | 60.6 |
| | Toner 7 | Toner resin S3 | 7.7 | 6.04 | 0.970 | 73.6 | 59.5 |
| | Toner 8 | Toner resin S9 | 7.7 | 6.04 | 0.969 | 73.4 | 60.4 |
| Comparative Example | Toner 9 | Polyester resin PE | 1.5 | 7.42 | 0.978 | 68.8 | 58.4 |
| | Toner 10 | St/2EHA/AMPS Copolymer | 1.5 | 7.26 | 0.976 | 68.8 | 58.5 |
| | Toner 11 | Zinc complex of di-t-butyl salicylic acid | 1.0 | 6.22 | 0.983 | 68.8 | 58.3 |

As shown in Table 3, toners 9 and 10 each had a slightly greater weight average particle diameter than toner 1. Toners 9 and 10 contained both coarse powder and fine powder in large amounts and had an extremely broad particle diameter distribution, and many agglomerates were observed. The yield of each of the toners 9 and 10 upon classification was about 50% as compared with toner 1.

Further, toners 1 to 11 were evaluated for printing out as follows. Table 4 shows the results.

The fog density on images was measured using a reflection densitometer (Reflectometer Model TC-6DS, manufactured by Tokyo Denshoku Co., Ltd.) and evaluation of fog was performed as follows. Assuming the worst white background reflection density after printing out was Ds, and average reflection density on paper before printing out was Dr, Ds−Dr was defined, as a fog quantity. When this value is 1.0% or less, suppression of fog is an extremely good level while when this value is 1.5% or less, the image is an image in which fog is substantially well-suppressed.

TABLE 4

| | | Charge quantity (μC/g) | | | Image density | | | Fog density | | |
|---|---|---|---|---|---|---|---|---|---|---|
| | | Initial | After endurance running | After severe endurance running | Initial | After endurance running | After severe endurance running | Initial | After endurance running | After severe endurance running |
| Example | Toner 1 | −40.3 | −39.9 | −38.2 | 1.51 | 1.50 | 1.48 | 0.6 | 0.6 | 0.7 |
| | Toner 2 | −38.2 | −38.6 | −37.6 | 1.50 | 1.50 | 1.49 | 0.6 | 0.6 | 0.7 |
| | Toner 3 | −44.2 | −43.9 | −40.2 | 1.48 | 1.48 | 1.47 | 0.5 | 0.5 | 0.6 |
| | Toner 4 | −48.5 | −48.1 | −45.1 | 1.47 | 1.48 | 1.48 | 0.4 | 0.4 | 0.5 |
| | Toner 5 | −39.8 | −39.4 | −37.0 | 1.49 | 1.48 | 1.46 | 0.7 | 0.8 | 0.8 |
| | Toner 6 | −35.8 | −38.7 | −36.5 | 1.44 | 1.47 | 1.47 | 0.9 | 0.8 | 0.8 |

TABLE 4-continued

| | | Charge quantity (μC/g) | | | Image density | | | Fog density | | |
|---|---|---|---|---|---|---|---|---|---|---|
| | | Initial | After endurance running | After severe endurance running | Initial | After endurance running | After severe endurance running | Initial | After endurance running | After severe endurance running |
| | Toner 7 | −41.5 | −40.6 | −39.9 | 1.46 | 1.46 | 1.46 | 0.8 | 0.8 | 0.8 |
| | Toner 8 | −38.9 | −42.1 | −38.7 | 1.45 | 1.47 | 1.45 | 0.9 | 0.7 | 0.9 |
| Comparative | Toner 9 | −35.7 | −31.0 | −19.8 | 1.45 | 1.40 | 1.18 | 0.9 | 1.2 | 2.1 |
| Example | Toner 10 | −18.4 | −33.5 | −18.7 | 1.13 | 1.33 | 1.14 | 1.6 | 1.0 | 1.9 |
| | Toner 11 | −39.3 | −38.4 | −29.4 | 1.50 | 1.48 | 1.39 | 0.8 | 0.9 | 1.6 |

Table 4 indicates that the toners 1 to 8 of the examples of the present invention each had good charging properties from the initial stage in printing out tests and it was confirmed that the good charging property could be maintained when 10,000 sheets were printed. Further, at the time of printing of 5,000 sheets under high temperature and high humidity conditions subsequently performed, a high charging property was maintained. As a result, both the image density and fog density were at good values and stable through duration.

On the other hand, although the toner 9 of the comparative example showed a relatively high value of initial charging quantity, this value was decreased slightly when 10,000 sheets were printed. Further, it was confirmed that the value was greatly decreased when 5,000 sheets were printed under high temperature and high humidity conditions. The image density was decreased as the charging quantity was decreased and finally, the image density was greatly decreased and in addition, the fog density showed a high value. Further, the toner 10 showed a low initial charging quantity, resulting in a poor charge rising property. In this toner, although the charging quantity increased as duration proceeds, it was decreased again under high temperature and high humidity conditions. As a result, satisfactory image density could not be obtained throughout duration. Further, the fog density scored a high value. The toner 11 showed a high charging quantity at the initial stage and also after printing of 10,000 sheets, and also showed good image density and good fog density. However, under high temperature and high humidity conditions, a slight decrease in a charging quantity was confirmed and also a decrease in image density was observed. In addition, the fog density was significantly increased.

<Production of Toner 12>

A mixture of the following materials was mixed well with a Henschel mixer (FM-57 Model, manufactured by Mitsui Miike Chemical Engineering Machine Co., Ltd.) and kneaded with a twin-screw kneader (PCM-30 Model, manufactured by Ikegai Corporation) set at a temperature of 130° C.

| | |
|---|---|
| Styrene-butyl acrylate-divinylbenzene copolymer (Tg 58° C., Mn 8,000, Mw 120,000) | 85.0 parts |
| Toner resin S7 | 15.0 parts |
| Magnetic iron oxide (average particle diameter 0.18 μm) | 100.0 parts |
| Polymethine wax | 5.0 parts |

(Mw: 1,850, Mw/Mn: 1.27, melting point: 78.6° C.)

The obtained kneaded preparation was cooled and coarsely pulverized to 1 mm or less using a hammer mill and then pulverized using a fine grinding mill by an air-jet method. The obtained pulverisates were classified to obtain toner particles. Further, hydrophobic silica fine powder was externally added to the toner particles in the same manner as in the production example of toner 1, to thereby obtain a toner 12.

The obtained toner 12 had a weight average particle diameter of 6.68 μm, an average circularity of 0.960, Tg of 56.9° C., and a heat absorption main peak at 74.0° C.

<Production of Toner 13>

A toner 13 was obtained in the same manner as in the production example of toner 12 except that 30 parts of the toner resin S8 was used instead of 15 parts of the toner resin S7.

The obtained toner 13 had a weight average particle diameter (D4) of 6.82 μm, an average circularity of 0.961, Tg 58.3° C., and a heat absorption main peak at 74.3° C.

Printing Test Method

By using a commercially available laser beam printer (LBP-930, manufactured by Canon, Inc.), 10,000 sheets were printed under normal temperature and normal humidity conditions (23.5° C., 60% RH) and further 5,000 sheets were printed under high temperature and high humidity conditions (30° C., 80% RH) while toner was supplied to the printer if required.

As a result, toners 12 and 13 each had an image density of 1.47 to 1.50 and the both were stable over a range of from the initial to after duration of 10,000 sheets and good images were obtained. Further, they both maintained a toner charge quantity of −30.0 μC/g on the toner carrier over a range of from initial to after duration of 10,000 sheets, thus showing good stability. Further, results of the measurement of image density and toner charging quantity in the case of printing under high temperature and high humidity conditions (30° C., 80% RH) indicated that they both maintained an image density of 1.45 or more and charge quantity of −25.0 μC/g or more. The above-mentioned results confirmed that the toners 12 and 13 of the present invention were practically excellent.

This application claims priority from Japanese Patent Application No. 2005-327142 filed on Nov. 11, 2005, the contents of which is incorporated herein by reference.

What is claimed is:

1. A toner comprising toner particles each of which contains at least a binder resin, a colorant, and a charge control resin, wherein the charge control resin has a main chain and an aryl group which is bonded to the main chain, wherein the main chain comprises a polyester unit produced by polycondensation of a dihydric alcohol component and a dibasic or tribasic aromatic carboxylic acid component, wherein the aryl group is represented by the following formula:

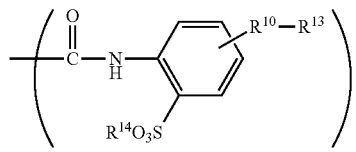

where $R^{10}$ to $R^{13}$ independently represent a hydrogen atom, an alkyl group having 1 to 4 carbon atoms, a hydroxyl group, or an alkoxyl group having 1 to 4 carbon atoms, and $R^{14}$ represents an alkyl group having 1 to 4 carbon atoms.

2. A toner according to claim 1, wherein the charge control resin is contained in an amount of 0.1 to 20.0 parts by mass with respect to 100.0 parts by mass of the binder resin.

3. A toner according to claim 1, wherein the toner particles are formed by a production method that involves a step of dispersing a composition that contains the charge control resin in an aqueous medium.

4. A toner according to claim 1, wherein the toner particles were produced by:
dissolving or dispersing the binder resin, the colorant and the charge control resin in an organic solvent to prepare a liquid mixture;
dispersing the liquid mixture in an aqueous medium to form the toner particles; and
removing the organic solvent from the toner particles.

5. A toner according to claim 1, wherein the toner particles were produced by:
mixing a monomer, the colorant, the charge control resin and a polymerization initiator to prepare a monomer composition;
dispersing the monomer composition in an aqueous medium, and
polymerizing the monomer in the monomer composition to form the toner particles.

6. A toner according to claim 1, wherein the charge control resin contains 0.1 to 0.9 mmol/g of the aryl group.

7. A toner according to claim 1, wherein the main chain is a hybrid resin where the polyester unit is bonded to a vinyl polymer unit formed by polymerization of a vinyl monomer component.

8. A toner according to claim 1, wherein the charge control resin has a weight average molecular weight (Mw) calculated by gel permeation chromatography within the range of 2,000 to 200,000.

9. A toner according to claim 1, wherein the charge control resin has a ratio (Mw/Mn) of a weight average molecular weight (Mw) calculated by gel permeation chromatography to a number average molecular weight (Mn) within the range of 1.0 to 6.0.

10. A toner according to claim 1, wherein the charge control resin has an acid value of 0.1 to 40.0 mgKOH/g.

* * * * *